United States Patent
Ge et al.

(10) Patent No.: US 11,443,462 B2
(45) Date of Patent: Sep. 13, 2022

(54) METHOD AND APPARATUS FOR GENERATING CARTOON FACE IMAGE, AND COMPUTER STORAGE MEDIUM

(71) Applicant: TENCENT TECHNOLOGY (SHENZHEN) COMPANY LIMITED, Shenzhen (CN)

(72) Inventors: Yanhao Ge, Shenzhen (CN); Xueyuan Xing, Shenzhen (CN); Bin Fu, Shenzhen (CN); Yirong Zeng, Shenzhen (CN); Pengcheng Shen, Shenzhen (CN); Chengjie Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/988,121

(22) Filed: Aug. 7, 2020

(65) Prior Publication Data
US 2020/0372692 A1    Nov. 26, 2020

Related U.S. Application Data

(63) Continuation of application No. PCT/CN2019/080003, filed on Mar. 28, 2019.

(30) Foreign Application Priority Data

May 23, 2018    (CN) .................. 201810501832.X

(51) Int. Cl.
*G06T 11/00*    (2006.01)
*G06T 11/60*    (2006.01)
*G06V 40/16*    (2022.01)

(52) U.S. Cl.
CPC ............ *G06T 11/001* (2013.01); *G06T 11/60* (2013.01); *G06V 40/165* (2022.01); *G06V 40/168* (2022.01)

(58) Field of Classification Search
None
See application file for complete search history.

(56) References Cited

U.S. PATENT DOCUMENTS 8,437,514 B2     5/2013   Wen et al.
10,402,689 B1 *  9/2019   Bogdanovych ......... G06T 11/60
(Continued)

FOREIGN PATENT DOCUMENTS

CN    105374055 A  *  3/2016
CN    105374055 A      3/2016
CN    108717719 A     10/2018

OTHER PUBLICATIONS

International Search Report and Written Opinion dated Jul. 4, 2019 in PCT Application No. PCT/CN2019/080003.

*Primary Examiner* — Yingchun He
(74) *Attorney, Agent, or Firm* — Arentfox Schiff LLP

(57) ABSTRACT

In a method for generating a cartoon face image that is performed by a computing device, a to-be-processed face image is obtained. Face feature information is recognized from the to-be-processed face image, and cartoon materials corresponding to feature parts of a face in the to-be-processed face image are obtained according to the face feature information. The obtained cartoon materials are cartoon face materials. The cartoon face materials include cartoon facial feature materials and another cartoon material other than the cartoon facial feature materials. Each of the cartoon facial feature materials are adjusted by using an adjustment parameter, and the other cartoon material are combined with the cartoon facial feature materials after adjustment to generate the cartoon face image.

20 Claims, 12 Drawing Sheets

(56) References Cited

U.S. PATENT DOCUMENTS

| | | | | |
|---|---|---|---|---|
| 10,748,322 B1* | 8/2020 | Pishevar | ............... | G06V 40/171 |
| 2007/0223827 A1* | 9/2007 | Nishimori | ............... | G06T 11/00 |
| | | | | 382/249 |
| 2009/0202114 A1* | 8/2009 | Morin | ................... | A63F 13/213 |
| | | | | 382/118 |
| 2009/0252435 A1* | 10/2009 | Wen | ..................... | G06K 9/6257 |
| | | | | 382/284 |
| 2009/0262989 A1* | 10/2009 | Kozakaya | ........... | G06K 9/00208 |
| | | | | 382/118 |
| 2012/0309520 A1* | 12/2012 | Evertt | ..................... | A63F 13/40 |
| | | | | 463/31 |
| 2014/0055554 A1* | 2/2014 | Du | ..................... | G06K 9/00268 |
| | | | | 348/14.07 |
| 2014/0198121 A1* | 7/2014 | Tong | ..................... | G06T 11/60 |
| | | | | 345/581 |
| 2015/0190716 A1* | 7/2015 | Evertt | .................... | A63F 13/63 |
| | | | | 463/31 |
| 2017/0069124 A1* | 3/2017 | Tong | ................... | G06F 16/5854 |
| 2018/0114056 A1* | 4/2018 | Wang | ................ | G06K 9/00228 |
| 2018/0158246 A1* | 6/2018 | Grau | ................ | G02B 27/0093 |
| 2019/0005306 A1* | 1/2019 | Wu | .................... | G06K 9/00255 |
| 2019/0080154 A1* | 3/2019 | Xu | ..................... | G06K 9/6274 |

\* cited by examiner

METHOD AND APPARATUS FOR GENERATING CARTOON FACE IMAGE, AND COMPUTER STORAGE MEDIUM

RELATED APPLICATIONS

This application is a continuation of International Application No. PCT/CN2019/080003, filed Mar. 28, 2019, which claims priority to Chinese Patent Application No. 201810501832.X, entitled "METHOD AND APPARATUS FOR GENERATING CARTOON FACE IMAGE, AND COMPUTER STORAGE MEDIUM" filed on May 23, 2018. The entire disclosures of the prior applications are hereby incorporated by reference in their entirety.

FIELD OF THE TECHNOLOGY

This application relates to the field of image processing technologies, including a method and an apparatus for generating a cartoon face image, and a computer storage medium.

BACKGROUND

A cartoon image has bright colors, vivid appearances, is highly recognizable, and has high affinity. A cartoon portrait is even more popular among users because of features of high generality, brevity, and humor. To satisfy user requirements, a growing quantity of photographing applications or image processing applications are provided with a cartoon special effect function. For example, a profile picture of a user may be converted into a corresponding cartoon face image, so that the user may easily create a cartoon portrait belonging to the user, thereby improving entertainment and interest.

Currently, a cartoon face image is usually obtained by performing, based on an image stylization algorithm, overall stylization conversion on an entire face picture of a to-be-processed face image. The algorithm is mainly to perform edge extraction on feature parts of a face of the to-be-processed face image, and then draw cartoon-style profiles of the feature parts of the face based on edge information of the feature parts of the face, to obtain a cartoon face image of which a profile is similar to that of a real face.

SUMMARY

In exemplary aspects, in a method for generating a cartoon face image that is performed by a computing device, a to-be-processed face image is obtained, and face feature information is recognized from the to-be-processed face image. Cartoon materials corresponding to feature parts of a face in the to-be-processed face image are obtained according to the face feature information. The cartoon materials are cartoon face materials. The cartoon face materials include cartoon facial feature materials and another cartoon material other than the cartoon facial feature materials. Each of the cartoon facial feature materials are adjusted by using an adjustment parameter, and the other cartoon material is combined with the cartoon facial feature materials after adjustment to generate the cartoon face image.

In exemplary aspects, in adjusting each of the cartoon facial feature materials, facial feature profile information of the to-be-processed face image and facial feature profile information of a preset standard face image are obtained. At least one of an offset ratio or a scaling ratio of each of the cartoon facial feature materials is obtained according to the facial feature profile information to obtain the adjustment parameter.

In exemplary aspects, in obtaining facial feature profile information of the to-be-processed face image and facial feature profile information of a preset standard face image, coordinates of key location points on profiles of a face shape, eyebrows, eyes, a nose, and a mouth of the to-be-processed face image and coordinates of key location points on profiles of a face shape, eyebrows, eyes, a nose, and a mouth of the preset standard face image are respectively obtained in order to obtain the facial feature profile information of the to-be-processed face image and the facial feature profile information of the preset standard face image.

In exemplary aspects, after respectively obtaining coordinates of key location points on profiles of a face shape, eyebrows, eyes, a nose, and a mouth of the to-be-processed face image and coordinates of key location points on profiles of a face shape, eyebrows, eyes, a nose, and a mouth of the preset standard face image, a transform matrix is determined according to a preset organ part of the to-be-processed face image, and coordinates of key location points on profiles of corresponding organ parts in the standard face image. Using the transform matrix, the coordinates of the key location points on the profiles of the face shape, the eyebrows, the eyes, the nose, and the mouth of the to-be-processed face image are converted into coordinates in a coordinate space of the standard face image, to adjust the facial feature profile information of the to-be-processed face image. At least one of the offset ratio or the scaling ratio of each material of the cartoon facial feature materials is obtained according to the adjusted facial feature profile information of the to-be-processed face image to obtain the adjustment parameter.

In exemplary aspects, in obtaining at least one of an offset ratio or a scaling ratio of each of the cartoon facial feature materials, a height scaling ratio of a face shape material of the cartoon facial feature materials is obtained. A horizontal offset ratio, a vertical offset ratio, a height scaling ratio, and a width scaling ratio of an eyebrow material of the cartoon facial feature materials are also obtained, and a horizontal offset ratio, a height scaling ratio, and a width scaling ratio of an eye material of the cartoon facial feature materials are obtained.

In exemplary aspects, in obtaining at least one of an offset ratio or a scaling ratio of each of the cartoon facial feature materials, a vertical offset ratio and a width scaling ratio of a nose material of the cartoon facial feature materials are obtained, and a vertical offset ratio, a height scaling ratio, and a width scaling ratio of a mouth material of the cartoon facial feature materials are obtained.

In exemplary aspects, in adjusting each of the cartoon facial feature materials, at least one of location information or size information of the cartoon facial feature materials, and at least one of location information or size information of standard cartoon facial feature parts of a preset standard cartoon face image are obtained. A height of the face shape material is adjusted according to a scaling ratio of the face shape material, size information of the face shape material, and size information of a face shape part of the standard cartoon facial feature parts.

In exemplary aspects, in adjusting each of the cartoon facial feature materials, a horizontal location, a vertical location, a width, and a height of the eyebrow material are adjusted according to an offset ratio and a scaling ratio of the eyebrow material, location information and size information of the eyebrow material, and location information and size information of an eyebrow part of the standard cartoon facial feature parts. A horizontal location, a height, and a width of the eye material are adjusted according to an offset ratio and a scaling ratio of the eye material, location information and size information of the eye material, and location information and size information of an eye part of the standard cartoon facial feature parts.

In exemplary aspects, in adjusting each of the cartoon facial feature materials, a vertical location and a width of the nose material are adjusted according to an offset ratio and a scaling ratio of the nose material, location information and size information of the nose material, and location information and size information of a nose part of the standard cartoon facial feature parts. A vertical location, a width, and a height of the mouth material are adjusted according to an offset ratio and a scaling ratio of the mouth material, location information and size information of the mouth material, and location information and size information of a mouth part of the standard cartoon facial feature parts.

In exemplary aspects, after obtaining at least one of an offset ratio or a scaling ratio of each material of the cartoon facial feature materials, the at least one of the offset ratio or the scaling ratio of each of the cartoon facial feature materials is adjusted according to a preset weight. Each of the cartoon facial feature materials is adjusted according to at least one of the offset ratio or the adjusted scaling ratio of each material after adjustment.

In exemplary aspects, in adjusting each of the cartoon facial feature materials, at least one of a preset offset ratio or a preset scaling ratio of each of the cartoon facial feature materials is obtained according to a corresponding one of the cartoon facial feature materials in order to obtain the adjustment parameter.

In exemplary aspects, in recognizing face feature information from the to-be-processed face image, facial feature information and hairstyle information of the to-be-processed face image is obtained. Gender information, age information, glasses information, hair color information and hair length information of the to-be-processed face image is obtained to obtain face attribute information. The face feature information is obtained according to the facial feature information, the hairstyle information, and the face attribute information.

In exemplary aspects, the facial feature information and the hairstyle information of the to-be-processed face image is obtained via a multi-task convolutional neural network model.

In exemplary aspects, the gender information, age information, glasses information, hair color information, and hair length information of the to-be-processed face image is obtained via a face attribute recognition network model.

In exemplary aspects, in obtaining cartoon materials corresponding to feature parts of a face in the to-be-processed face image according to the face feature information, a cartoon hairstyle material is obtained according to the hairstyle information, the hair color information, and the hair length information. The cartoon hairstyle material includes a cartoon back hair material in a case that the hair length information indicates long hair. A cartoon glasses material is obtained according to the glasses information in a case that the glasses information indicates that glasses are worn. A cartoon face wrinkle or nasolabial fold material is obtained according to the age information in a case that the age information indicates an age that is greater than a preset age.

In exemplary aspects, in obtaining a cartoon hairstyle material according to the hairstyle information, the hair color information, and the hair length information, a cartoon hairstyle category to which a hairstyle of the to-be-processed face image belongs is determined according to the hairstyle information to further determine a plurality of hair shape materials in the cartoon hairstyle category. The hairstyle of the to-be-processed face image is matched with the plurality of hair shape materials one by one, to obtain a similarity between the hairstyle of the to-be-processed face image and each of the hair shape materials. A hair shape material with a highest similarity is determined as a hair shape material corresponding to the hairstyle information of the to-be-processed face image.

In exemplary aspects, in obtaining a to-be-processed face image, an input image is obtained, and a body region in the input image is recognized using a fully convolutional network model. A background region, which is other than the body region, is removed from the input image, to further obtain the to-be-processed face image.

In exemplary aspects, an apparatus for generating a cartoon face image includes circuitry that obtains a to-be-processed face image, and recognizes face feature information from the to-be-processed face image. The circuitry obtains cartoon materials corresponding to feature parts of a face in the to-be-processed face image according to the face feature information, to obtain cartoon face materials. The cartoon face materials include cartoon facial feature materials and another cartoon material other than the cartoon facial feature materials. The circuitry adjusts each of the cartoon facial feature materials by using an adjustment parameter, and combines the other cartoon material with the adjusted cartoon facial feature materials to generate the cartoon face image.

In exemplary aspects, the circuitry obtains facial feature profile information of the to-be-processed face image and facial feature profile information of a preset standard face image, and obtains at least one of an offset ratio or a scaling ratio of each material of the cartoon facial feature materials according to the facial feature profile information, to obtain the adjustment parameter.

In exemplary aspects, a non-transitory computer-readable medium stores computer-readable instructions that, when executed by a processor, cause the processor to perform a method in which a to-be-processed face image is obtained, and face feature information from the to-be-processed face image is recognized. Cartoon materials corresponding to feature parts of a face in the to-be-processed face image are obtained according to the face feature information, to obtain cartoon face materials. The cartoon face materials include cartoon facial feature materials and another cartoon material other than the cartoon facial feature materials. Each of the cartoon facial feature materials is adjusted by using an adjustment parameter, and the other cartoon material is combined with the cartoon facial feature materials after adjustment to generate a cartoon face image.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

The following describes exemplary embodiments of the present disclosure with reference to the accompanying drawings. As can be appreciated, the described embodiments are not meant to be exhaustive of all possible embodiments, and other embodiments are possible without departing from the scope of the present disclosure.

A cartoon face image is obtained through a manner of overall style conversion, and feature parts of a body in the generated cartoon face image are integrated. As a result, an operation such as modification or replacement cannot be independently performed on a feature part in the cartoon face image subsequently. For example, when a feature part of the cartoon face image needs to be subsequently adjusted, the adjustment can be performed only through a manner of overall adjustment. For example, when a size of an eye needs to be adjusted, the adjustment can be performed only by integrally stretching the cartoon face image. However, the integral stretching may cause the deformation of other parts of the cartoon face image, and greatly reduce the operability of the cartoon face image. In addition, the similarity between the cartoon face and a real face is reduced.

In view of this, the exemplary embodiments of the present disclosure provide a method and an apparatus for generating a cartoon face image, and a computer storage medium. The apparatus for generating a cartoon face image may be, for example, integrated in a terminal such as a mobile phone, a tablet computer, or a personal computer (PC). Alternatively, the apparatus may be a system including a server and a terminal.

Figure 1A:
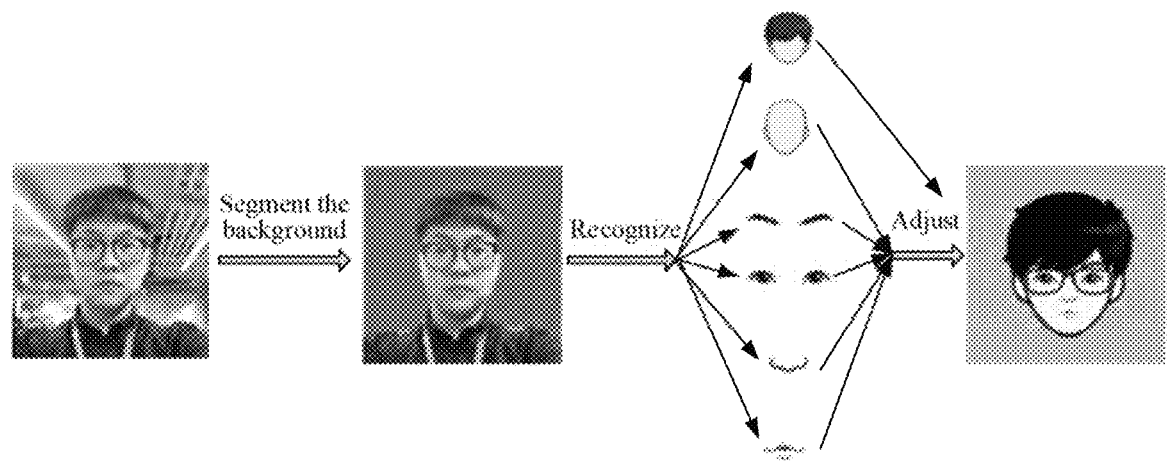
FIG. 1a is a framework diagram of a method for generating a cartoon face image according to an exemplary embodiment of the present disclosure.

For example, referring to FIG. 1a, the apparatus may be configured to obtain a to-be-processed face image. The to-be-processed face image may be a body image that is obtained by segmenting a background part and a body part from an input image and removing the background part. Then face feature information is recognized from the to-be-processed face image, where the face feature information may include facial feature information, hairstyle information, and the like. In this way, cartoon materials respectively corresponding to feature parts of a face in the to-be-processed face image are obtained according to the face feature information, to obtain a cartoon face material. For example, a face shape material is determined according to face shape information in the facial feature information, an eye material is determined according to eye information, an eyebrow material is determined according to eyebrow information, a nose material is determined according to nose information, and a mouth material is determined according to mouth information. Then each material of the cartoon facial feature materials is adjusted by using an adjustment parameter, to combine another cartoon material with the adjusted cartoon facial feature materials, to generate a cartoon face image. Because the cartoon materials of the feature parts of the face are obtained one by one and are combined to generate the cartoon face image, the feature parts of the face of the generated cartoon face image are independent of each other. Through the foregoing manner, an operation such as modification or replacement can be independently performed on a feature part in the cartoon face image subsequently without affecting another feature part, so that the operability of the cartoon face image is improved. In addition, each material of the cartoon facial feature materials is adjusted, so that the cartoon facial feature materials are more similar to real facial features, thereby improving the similarity between the cartoon face image and the to-be-processed face image.

Figure 1B:
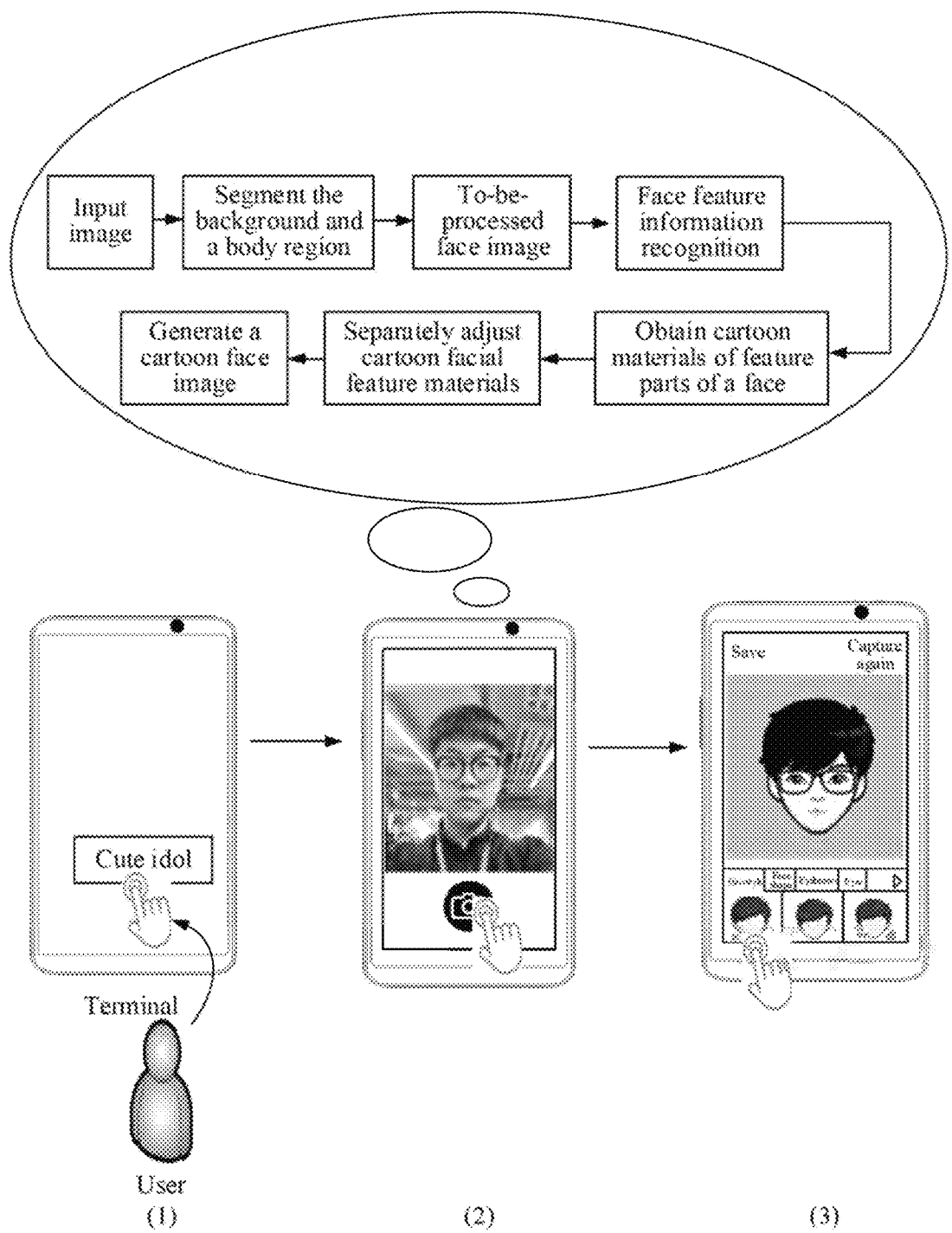
FIG. 1b is a schematic diagram of a scenario of a method for generating a cartoon face image according to an exemplary embodiment of the present disclosure.

As shown in FIG. 1b, the method for generating a cartoon face image of the exemplary embodiment may be applicable to various photographing scenarios or image processing scenarios, and may be applied to various social applications (APPs), image processing APPs, and the like, to provide a cartoon face image function for various APPs. For example, in an image processing APP, a user interface used for generating a cartoon face image may be provided, such as a "cute idol" tapping button shown in FIG. 1b(1). After a user taps the button, a local album may pop up for the user to select a photo, or as shown in FIG. 1b(2), a front-facing camera of a terminal may be turned on to obtain a selfie of the user. An input image is obtained by obtaining the photo selected by the user or the selfie, and the to-be-processed face image in which the background is removed is obtained by segmenting the background and a body region from the input image. Then face feature information is recognized from the to-be-processed face image, to obtain cartoon materials corresponding to feature parts of a face in the to-be-processed face image according to the face feature information, where the cartoon materials are, for example, cartoon facial feature materials. Then each material of the cartoon facial feature materials is adjusted, so that the cartoon facial feature materials are more similar to real facial features. Then the cartoon face image is generated according to the adjusted cartoon facial feature materials and another cartoon material other than the cartoon facial feature materials, and the cartoon face image is displayed. As shown in FIG. 1b(3), in an interface displaying the generated cartoon face image, cartoon materials of feature parts of a face are further provided to the user for selection. The user may select a cartoon material to replace a material of a corresponding part in the generated cartoon face image.

In an exemplary embodiment, a description is provided from the perspective of a terminal. That is, the method, which is provided by the exemplary embodiment of the present disclosure, for generating a cartoon face image may be performed by a computing device such as a terminal device.

Figure 2A:
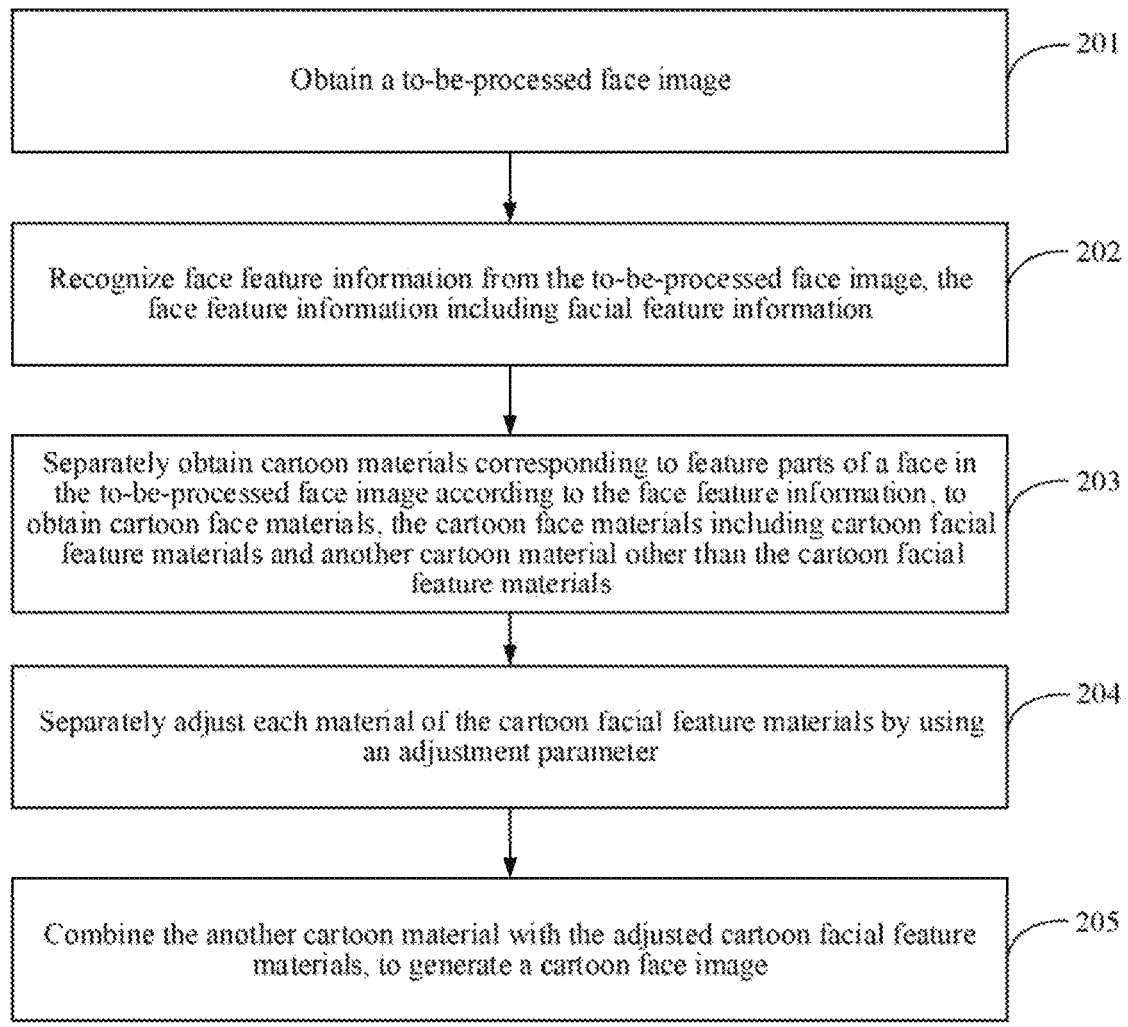
FIG. 2a is a schematic flowchart of a method for generating a cartoon face image according to an exemplary embodiment of the present disclosure.
Figure 2B:
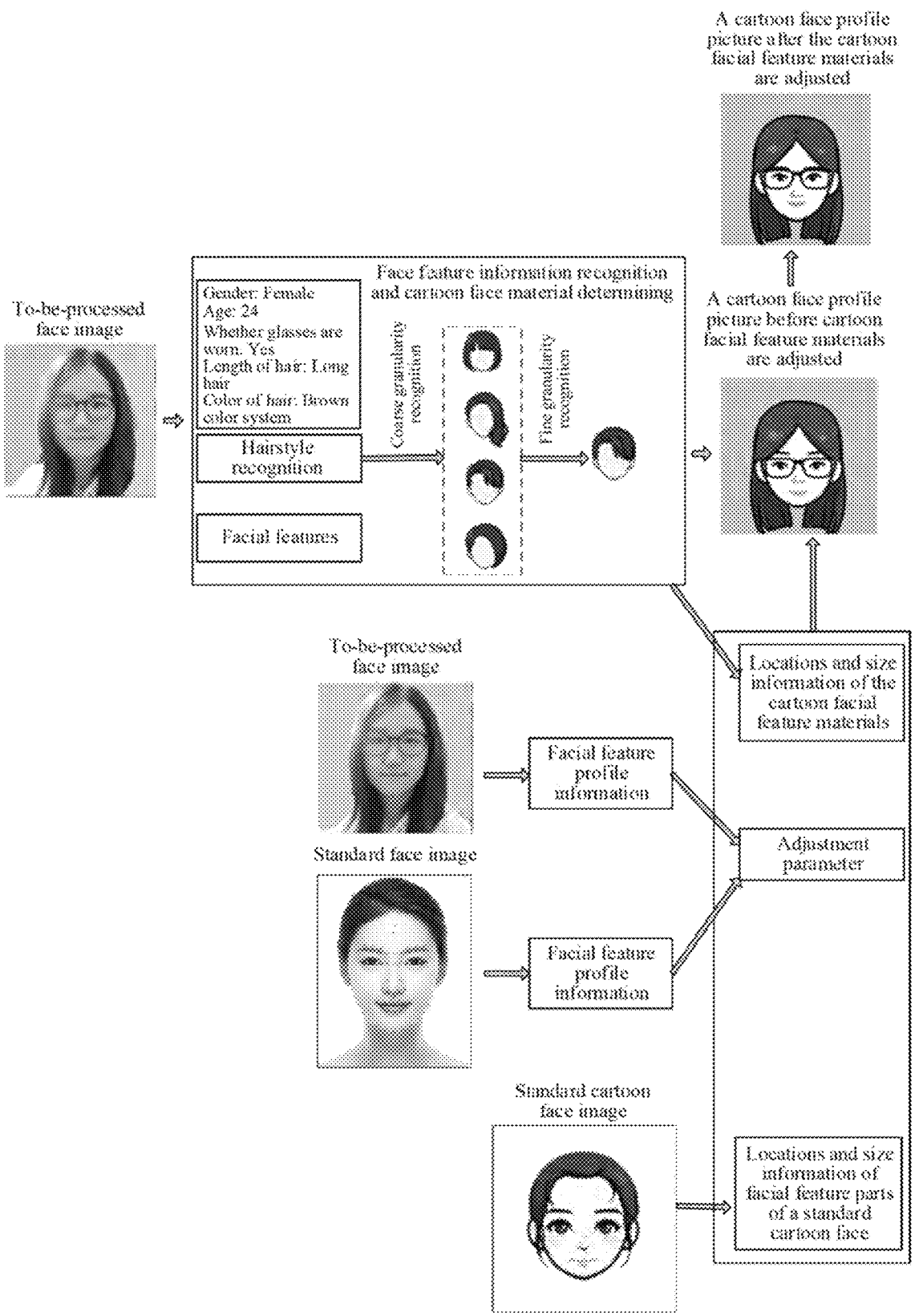
FIG. 2b is a schematic picture-text flowchart of a method for generating a cartoon face image according to an exemplary embodiment of the present disclosure.

Referring to FIG. 2a and with reference to FIG. 2b, the method for generating a cartoon face image of this embodiment of this application may include the following steps.

In step 201, a to-be-processed face image is obtained. The to-be-processed face image may be an image including a real face. An input image may be directly used as the to-be-processed face image, or the to-be-processed face image may be obtained by processing the input image. In an exemplary embodiment, obtaining a to-be-processed face image may include the following sub-steps.

In a first sub-step, an input image is obtained. The input image may be, for example, a selfie of a user, or a photo selected from an album by the user, or may be a photo downloaded from the network, or the like. In a second sub-step, a body region is recognized in the input image by using a fully convolutional network model.

Figure 3:
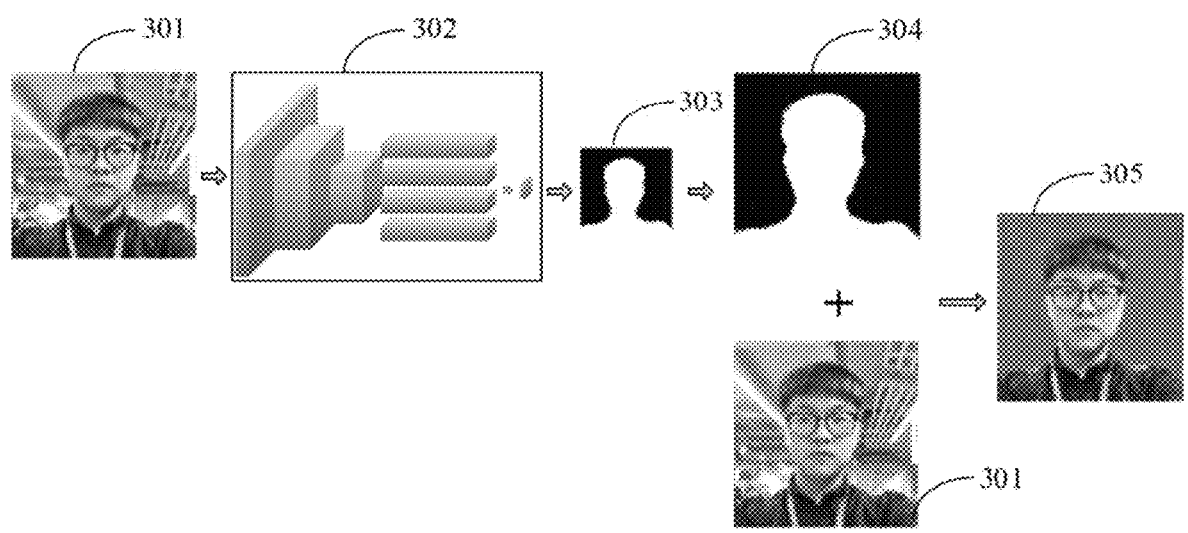
FIG. 3 is a schematic flow chart of obtaining a to-be-processed face image in a method for generating a cartoon face image according to an exemplary embodiment of the present disclosure.

The background and a body region may be segmented from the input image by using the fully convolutional network (FCN) model. The FCN model may include 13 convolution layers of which a convolution kernel is 3*3, five maxpooling layers of 3*3, and four parallel dilation convolution layers of which dilation coefficients are respectively 6, 12, 18, and 24. For example, as shown in FIG. 3, an input image 301 is inputted into an FCN model 302. Pixel data of each pixel of the input image 301 enters the four dilation convolution layers after passing through the 13 convolution layers of which the convolution kernel is 3*3 and five maxpooling layers of 3*3. After the pixel data is processed by the four dilation convolution layers and after a summation operation and a dropout operation are performed on the outputted pixel data, pixels of the body region and pixels of a non-body region (that is, the background region) may be recognized. Then a pixel-wise binary classification operation is performed on the pixels of the body region and the pixels of the background region, that is, pixel values of the pixels of the body region are 1, and pixel values of the pixels of the background region are 0, to obtain a mask image 303. In the mask image 303, the background region is black, and the body region is white. Then a size of the mask image 303 is proportionally scaled to a size of the input image, to output a mask image 304 of which a size is the same as the size of the input image 301.

In a third sub-step, the background region, which is other than the body region, is removed from the input image, to further obtain the to-be-processed face image. A binarization operation may be performed on the mask image 304 and the input image 301, and a result of the operation is outputting a to-be-processed face image 305. Specifically, a pixel value of each pixel of the mask image is multiplied by a pixel value of a corresponding pixel of the input image 301. Because the pixel values of the pixels of the background region in the mask image are 0, after the pixel value is multiplied by the pixel value of the pixel of the background region of the input image 301, a result of multiplication is still 0. Because the pixel values of the pixels of the body region in the mask image are 1, after the pixel value is multiplied by the pixel value of the pixel of the body region of input image 301, a result of multiplication is still the pixel value of the pixel of the body region of input image 301. As a result, an image of the background region of the input image 301 may be removed, to obtain a real body image 305 including only an image of the body region.

In an exemplary embodiment, a background image is prevented, by removing a background part, from interfering with face detection, thereby improving the accuracy of face detection.

In step 202, face feature information is recognized from the to-be-processed image. The face feature information includes facial feature information. The face feature information may include the facial feature information and hair information, and may further include face attribute information such as gender information and age information. In an exemplary embodiment, facial features of a face are a face shape, eyebrows, eyes, a nose, and a mouth. Specifically, the recognizing face feature information from the to-be-processed face image may include the following sub-steps.

In a first sub-step, facial feature information and hairstyle information of the to-be-processed face image is obtained by using a multi-task convolutional neural network (CNN) model.

Figure 4:
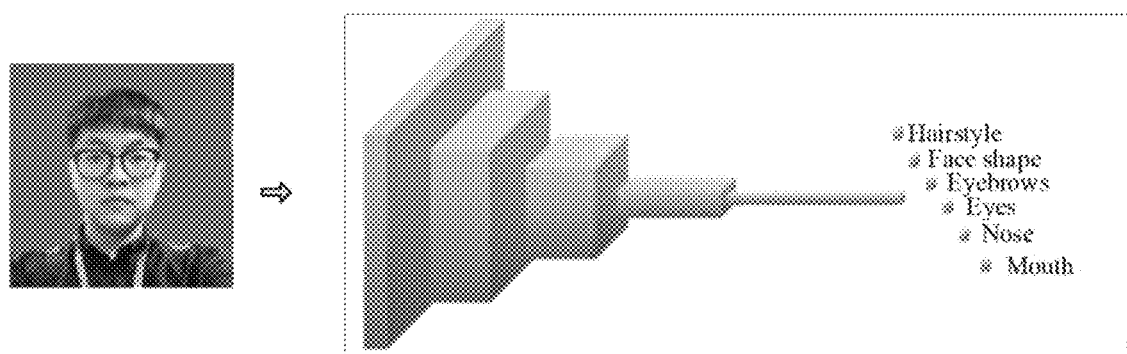
FIG. 4 is a schematic flowchart of obtaining face feature information in a method for generating a cartoon face image according to an exemplary embodiment of the present disclosure.

The facial feature information includes face shape information, and shape information of eyebrows, eyes, a nose, and a mouth. The face shape information is information representing a face shape, for example, an oval face or a round face. The hairstyle information is information representing a hairstyle shape, for example, center parting, side parting, or straight bangs. As shown in FIG. 4, the to-be-processed face image is inputted into the CNN model. The CNN model extracts a deep semantic feature of a face mainly through 18 convolution layers of 3*3 and a skipconnection structure, and accesses a plurality of classification branches to an output layer. The classification branches respectively correspond to a hairstyle, a face shape, eyebrows, eyes, a nose, a mouth, and the like of a face. In this way, the hairstyle information and the facial feature information are obtained.

In a second sub-step, gender information, age information, glasses information, hair color information and hair length information of the to-be-processed face image is obtained by using a face attribute recognition network model, to obtain face attribute information. The face attribute recognition network model may be a common face attribute recognition network model, for example, an attribute recognition network model based on neural network recognition.

In a third sub-step, the face feature information according to the facial feature information, the hairstyle information, and the face attribute information are obtained. In an exemplary embodiment, the face feature information includes the facial feature information, the hairstyle information, and the face attribute information.

In step 203, cartoon materials corresponding to feature parts of a face in the to-be-processed face image are obtained according to the face feature information, to obtain cartoon face materials, the cartoon face materials including cartoon facial feature materials and another cartoon material other than the cartoon facial feature materials.

Shapes of a face shape, eyebrows, eyes, a nose, and a mouth of the face in the to-be-processed face image may be determined according to the facial feature information in the face feature information, and a hairstyle shape of the face in the to-be-processed face image may be determined according to the hairstyle information, so that the cartoon materials of the feature parts of the face may be determined from a material library. In addition, the face attribute information may help obtain a hairstyle material or a face shape material. Specifically, the obtaining cartoon face materials according to the face feature information may include the following sub-steps.

In a first sub-step, a cartoon hairstyle material is obtained according to the hairstyle information, the hair color information, and the hair length information, the cartoon hairstyle material including a cartoon back hair material in a case that the hair length information indicates long hair. In an exemplary embodiment, hair that can be captured what the back of a head of a person is directly opposite to a lens of a camera is referred to as back hair, and hair that can be captured when a face of a person is directly opposite to a lens of a camera is referred to as front hair. A cartoon material of the back hair is referred to as a cartoon back hair material, and a cartoon material of the front hair is referred to as a cartoon front hair material.

A hair shape material such as a center parting hair material or a straight bangs hair material may be first determined according to the hairstyle information, then a hair color material is determined according to the hair color information, so that the hair color material and the hair shape material are combined, to obtain a cartoon hairstyle material corresponding to the hairstyle and the hair color of the to-be-processed face image. In addition, the hair length information is information representing whether the hair in the to-be-processed face image is long hair or short hair. When the hair length information indicates long hair, the cartoon back hair material is selected, where the cartoon hairstyle material includes the cartoon back hair material. Otherwise, when the hair length information indicates short hair, no cartoon back hair material is added.

Because a variation range of the hairstyle is relatively large, in this embodiment, the hair shape material corresponding to the hairstyle information is determined by using a multi-level hairstyle recognition manner from a coarse granularity to a fine granularity. Before the determining, a hair shape material library is classified, where the hair shape material library includes a male hairstyle material library and a female hairstyle material library. Using the male hairstyle material library as an example, all hair shape materials are assorted according to a hairstyle large category. A cartoon hairstyle large category includes, for example, a center parting large category, a straight bangs large category, a side parting large category, or a non-bangs large category. A plurality of hair shape materials, that is, cartoon hairstyle small categories, that is, specific hairstyles, are assorted in each cartoon hairstyle large category. For example, a plurality of hair shape materials assorted in the straight bangs large category include a hairstyle of straight bangs covering eyebrows, a hairstyle of straight bangs not covering eyebrows, a hairstyle of straight bangs of different lengths, a hairstyle of straight bangs of relatively large obliqueness, a hairstyle of straight hangs of relatively small obliqueness, and the like.

Figure 5:
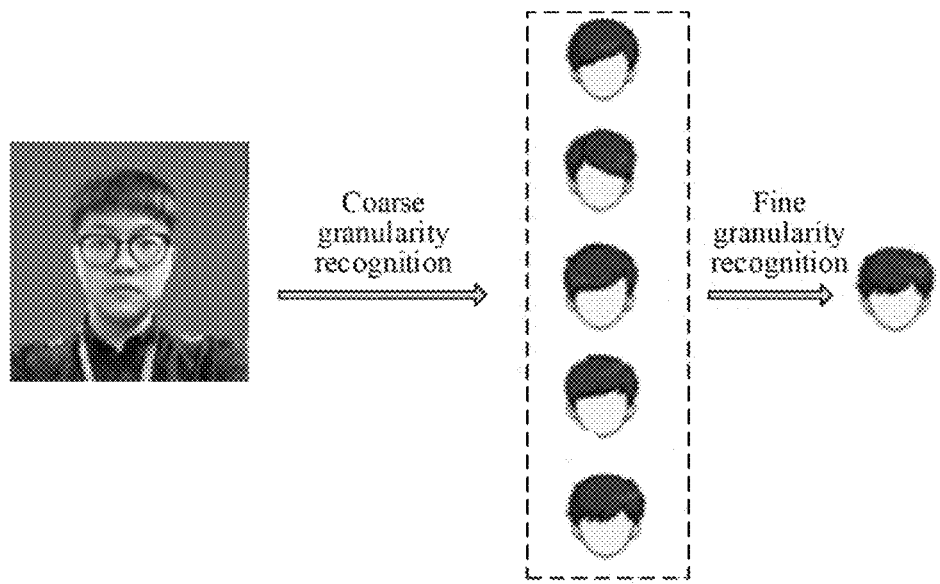
FIG. 5 is a schematic flowchart of recognizing a hair shape material in a method for generating a cartoon face image according to an exemplary embodiment of the present disclosure.

When a cartoon hair shape material is determined, as shown in FIG. 5, a cartoon hairstyle large category to which the hairstyle in the to-be-processed face image belongs may be determined according to the hairstyle information, that is, coarse granularity recognition. For example, as shown in FIG. 5, a result of the coarse granularity recognition is a cartoon straight bangs large category. As a result, a plurality of hair shape materials in the cartoon hairstyle large category can be determined. Then the hairstyle in the to-be-processed face image is matched with the plurality of hair shape materials one by one, to obtain the similarity between the hairstyle in the to-be-processed face image and each hair shape material, thereby determining a hair shape material with a highest similarity as a hair shape material corresponding to the hairstyle information of the to-be-processed face image, that is, fine granularity recognition. As shown in FIG. 5, a result of the fine granularity recognition is a hair shape material in the cartoon straight bangs large category. After the hair shape material is determined, the cartoon hairstyle material is obtained according to the hair shape material with a highest similarity.

In a second sub-step, a cartoon glasses material is obtained according to the glasses information in a case that the glasses information indicates that glasses are worn.

In a third sub-step, a cartoon face wrinkle or nasolabial fold material is obtained according to the age information in a case that the age information indicates an age that is greater than a preset age. The preset age may be, for example, thirty years old or thirty-five years old. No cartoon face wrinkle or nasolabial fold material is added in a case that the age information indicates an age that is less than or equal to the preset age.

Therefore, in an exemplary embodiment, the cartoon hairstyle material, the cartoon facial features (the face shape, the eyebrows, the eyes, the nose, and the mouth), the cartoon glasses material, the cartoon back hair material, the cartoon wrinkle material, and the like may be determined according to the face feature information.

In step 204, each material of the cartoon facial feature materials is adjusted by using an adjustment parameter. In an exemplary embodiment, the adjustment parameter may be obtained through facial feature profile information of the to-be-processed face image and facial feature profile information of a preset standard face image. Specifically, in step 204, facial feature profile information of the to-be-processed face image and facial feature profile information of a preset standard face image may be obtained, and an offset ratio and/or a scaling ratio of each material of the cartoon facial feature materials according to the facial feature profile information may be obtained to determine the adjustment parameter.

The facial feature profile information includes face shape profile information, eyebrow profile information, eye profile information, nose profile information, and mouth profile information. In an exemplary embodiment, a standard face image is preset. The adjustment parameter is an adjustment parameter about a location and a size ratio of the cartoon facial feature material.

In obtaining facial feature profile information of the to-be-processed face image and facial feature profile information of a preset standard face, coordinates of key location points on profiles of a face shape, eyebrows, eyes, a nose, and a mouth of the to-be-processed face image and coordinates of key location points on profiles of a face shape, eyebrows, eyes, a nose, and a mouth of the preset standard face image are respectively obtained to obtain the facial feature profile information of the to-be-processed face image and the facial feature profile information of the preset standard face image.

Figure 6:
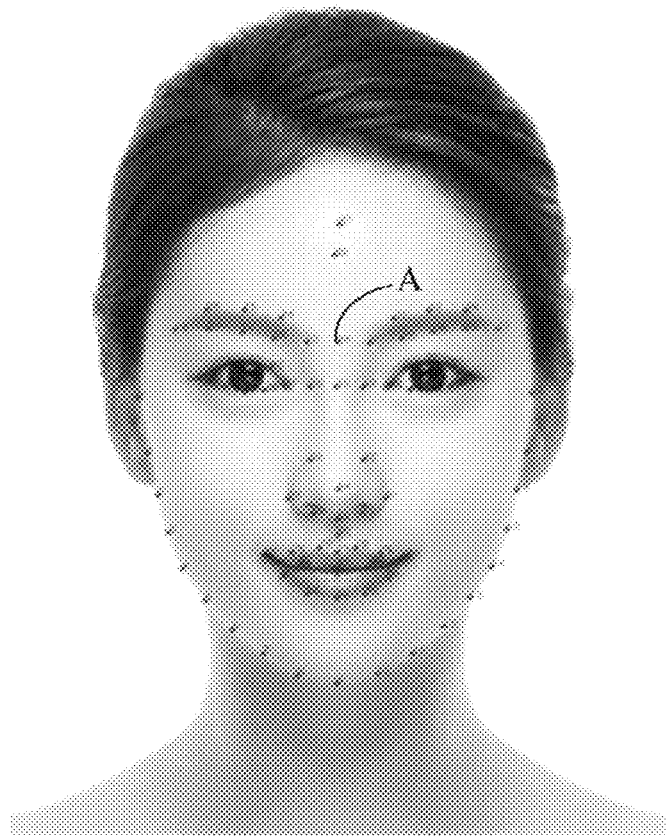
FIG. 6 is a schematic diagram of key location points in a face in a method for generating a cartoon face image according to an exemplary embodiment of the present disclosure.

Therefore, the facial feature profile information of the to-be-processed face image includes the coordinates of the key location points on the profiles of the face shape, the eyebrows, the eyes, the nose, and the mouth of the face in to-be-processed face image, and the facial feature profile information of the standard face image includes the coordinates of the key location points on the profiles of the face shape, the eyebrows, the eyes, the nose, and the mouth of the face in the standard face image. Key location points on a facial feature profile of the standard face image are first determined. As shown in FIG. 6, 90 location points on the face may be extracted. FIG. 6 shows the standard face image. The key location points on the facial feature profile may be represented by black dots on a facial feature profile shown in FIG. 6. In addition, aside from the key location points on the facial feature profile, a plurality of key location points between the eyebrows, a plurality of key location points between the eyes, and a plurality of key location points on a forehead are further determined. The facial feature profile information of the standard face image is obtained by obtaining the coordinates of the key location points (including the key location points on the facial feature profile) on the face in the standard face image.

After the key location points on the face of the standard face image are determined, face detection is performed on the to-be-processed face image, to determine key location points corresponding to the key location points on the face of the standard face image, thereby further obtaining coordinates of the key location points, so that the facial feature profile information of the to-be-processed face image may be obtained.

After the facial feature profile information of the to-be-processed face image and the facial feature profile information of the standard face image are obtained, the method of an exemplary embodiment may further include the following steps. A transform matrix may be determined according to a preset organ part of the to-be-processed face image, and coordinates of key location points on profiles of corresponding organ parts in the standard face image. Using the transform matrix, the coordinates of the key location points on the profiles of the face shape, the eyebrows, the eyes, the nose, and the mouth of the to-be-processed face image are converted into coordinates in a coordinate space of the standard face image, to adjust the facial feature profile information of the to-be-processed face image.

For example, the preset organ part may be the eyes. Using a key location point on an eye profile as a standard, coordinates of a key location point on the eye profile of the to-be-processed face image are translated and scaled by using the least square method, so that the coordinates are converted into the coordinate space of the standard face image. A conversion result may be a shortest distance between the key location point on the eye profile of the to-be-processed face image and a corresponding key location point of an eye profile of the standard face image. As a result, a coordinate space transform matrix of the key location points on the face in the to-be-processed face image may be determined. In this way, by using the transform matrix, the coordinates of the key location points on the face in the to-be-processed face image are all converted into the coordinates in the coordinate space of the standard face image, so that coordinate conversion is performed.

In obtaining an offset ratio and/or a scaling ratio of each material of the cartoon facial feature materials according to the facial feature profile information, to obtain the adjustment parameter, the offset ratio and/or the scaling ratio of each material of the cartoon facial feature materials are obtained according to the adjusted facial feature profile information of the to-be-processed face image in order to obtain the adjustment parameter.

In obtaining the offset ratio and/or the scaling ratio of each material of the cartoon facial feature materials, a height scaling ratio of a face shape material of the cartoon facial feature materials is obtained, a horizontal offset ratio, a vertical offset ratio, a height scaling ratio, and a width scaling ratio of an eyebrow material of the cartoon facial feature materials are obtained, and a horizontal offset ratio, a height scaling ratio, and a width scaling ratio of an eye material of the cartoon facial feature materials are obtained. A vertical offset ratio and a width scaling ratio of a nose material of the cartoon facial feature materials are also obtained, as are a vertical offset ratio, a height scaling ratio, and a width scaling ratio of a mouth material of the cartoon facial feature materials. These values are all obtained to determine the adjustment parameter.

Further, obtaining a height scaling ratio of a face shape material of the cartoon facial feature materials may include the following sub-steps.

In a first sub-step, coordinates of a face reference point in the to-be-processed face image and coordinates of a face reference point in the standard face image are obtained. Any key location point on the face may be selected as the face reference point according to an actual requirement. In an exemplary embodiment, as shown in FIG. 6, a center point between the eyebrows is selected as a face reference point A.

In a second sub-step, a width and a height of the face shape of the to-be-processed face image are obtained according to coordinates of key location points on a face profile of the to-be-processed face image and the coordinates of the face reference point of the to-be-processed face image, and a first aspect ratio of the face shape of the to-be-processed face image according to the width and the height of the face shape of the to-be-processed face image is obtained.

In a third sub-step, a width and a height of the face shape of the standard face image according are obtained to coordinates of key location points on a face profile of the standard face image and the coordinates of the face reference point of the standard face image, and a second aspect ratio of the face shape of the standard face image according to the width and the height of the face shape of the standard face image is obtained.

Figure 7:
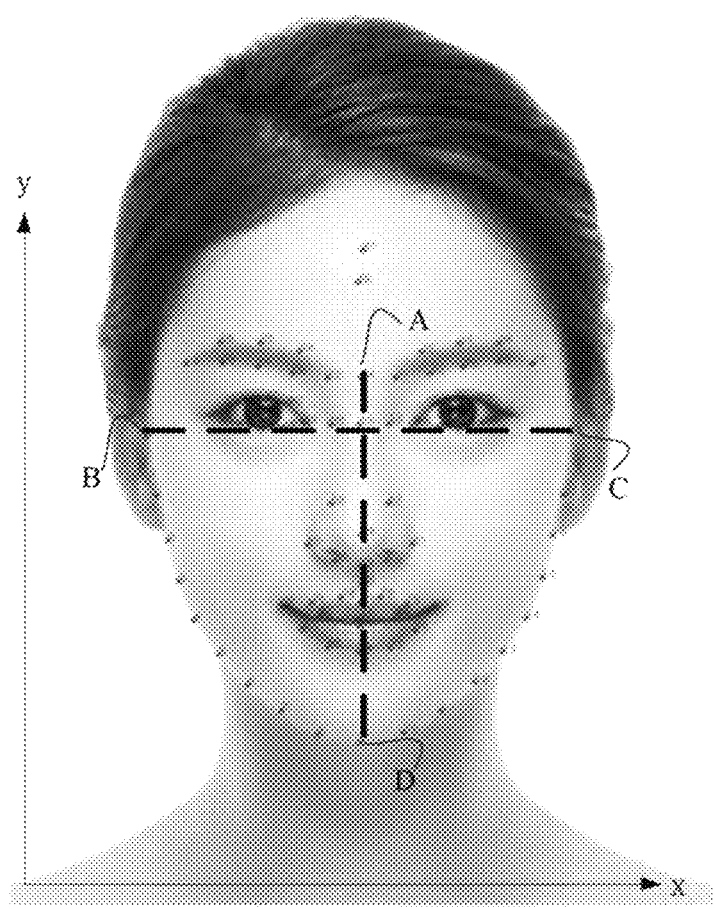
FIG. 7 is a schematic diagram of a width and a height of a face shape in a method for generating a cartoon face image according to an exemplary embodiment of the present disclosure.

A width of a face shape may be obtained by calculating a difference between coordinates, which are on an x-axis, of two key location points that are bilaterally symmetrical in the face shape. The two selected key location points are two key location points rendering a largest difference. A height of a face shape may be obtained by calculating a difference between coordinates, which are on a y-axis, of the face reference point A and a location point at the bottom of the face shape. Both the width and the height are absolute values of the corresponding differences. For example, as shown in FIG. 7, using the width and the height of the face shape of the standard face image as an example, the width of the face shape is an absolute value of a difference between coordinates, which are on an x-axis, of a key location point B at the upper left corner and a symmetrical key location point C at the upper right corner. That is, a length of a horizontal dashed line shown in FIG. 7 is the width of the face shape. The height of the face shape is an absolute value of a difference between coordinates, which are on a y-axis, of a location point D at the bottom of the face shape and the face reference point A (that is, the center point between the eyebrows). That is, a length of a vertical dashed line shown in FIG. 7 is the height of the face shape.

The aspect ratio is a ratio of the width of the face shape to the height of the face shape. The first aspect ratio is a ratio of the width of the face shape of the to-be-processed face image to the height of the face shape of the to-be-processed face image, and the second aspect ratio is a ratio of the width of the face shape of the standard face image to the height of the face shape of the standard face image.

In a fourth sub-step, the height scaling ratio of the face shape material is obtained according to the first aspect ratio and the second aspect ratio. The height scaling ratio of the face shape material is a ratio of the first aspect ratio to the second aspect ratio. Obtaining the width scaling ratios of the eyebrow material, the eye material, the nose material, and the mouth material of the cartoon facial feature materials and the height scaling ratios of the eyebrow material, the eye material, and the mouth material may include the following additional sub-steps.

In a first additional sub-step, widths and heights of the eyebrows, the eyes, and the mouth in the to-be-processed face image and the width of the nose in the to-be-processed face image are obtained according to coordinates of key location points on the profiles of the eyebrows, the eyes, the nose, and the mouth in the to-be-processed face image.

In a second additional sub-step, first width occupation ratios of the eyebrows, the eyes, the nose, and the mouth of the to-be-processed face image are obtained according to the widths of the eyebrows, the eyes, the nose, and the mouth of the to-be-processed face image and the width of the face shape of the to-be-processed face image.

In a third additional sub-step, first height occupation ratios of the eyebrows, the eyes, and the mouth of the to-be-processed face image are obtained according to the heights of the eyebrows, the eyes, and the mouth of the to-be-processed face image and the height of the face shape of the to-be-processed face image.

In a fourth additional sub-step, widths and heights of the eyebrows, the eyes, and the mouth in the standard face image and the width of the nose in the standard face image are obtained according to coordinates of key location points on the profiles of the eyebrows, the eyes, the nose, and the mouth in the standard face image.

In a fifth additional sub-step, second width occupation ratios of the eyebrows, the eyes, the nose, and the mouth of the standard face image are obtained according to the width of the eyebrows, the eyes, the nose, and the mouth of the standard face image and the width of the face shape of the standard face image.

In a sixth additional sub-step, second height occupation ratios of the eyebrows, the eyes, and the mouth of the standard face image are obtained according to the heights of the eyebrows, the eyes, and the mouth of the standard face image and the height of the face shape of the standard face image.

In a seventh additional sub-step, the width scaling ratios of the eyebrow material, the eye material, the nose material, and the mouth material are obtained according to the first width occupation ratios and the second width occupation ratios, and the height scaling ratios of the eyebrow material, the eye material, and the mouth material are obtained according to the first height occupation ratios and the second height occupation ratios.

Figure 8:
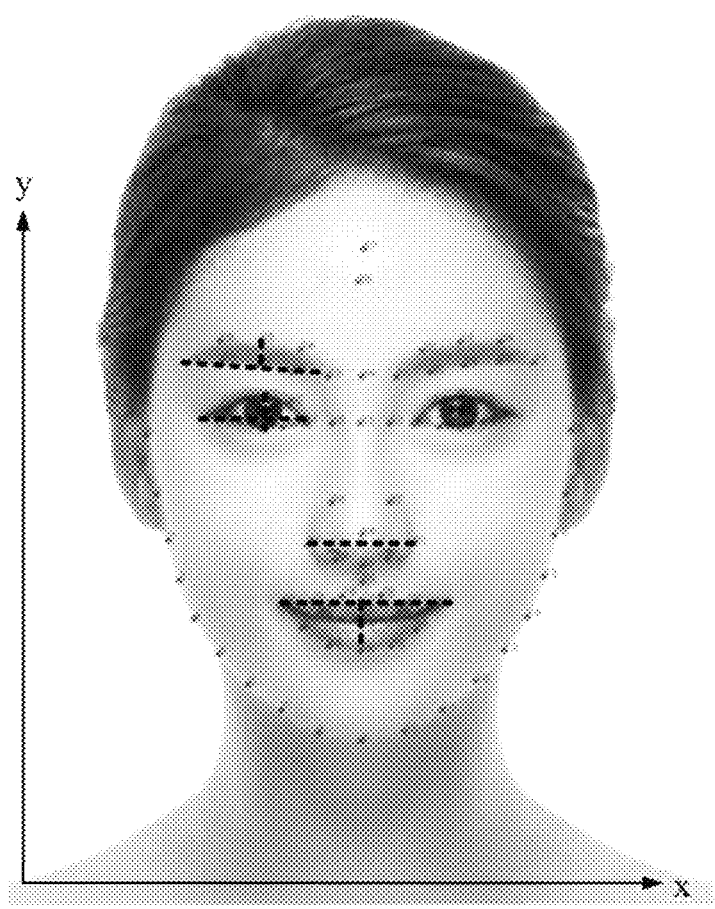
FIG. 8 is a schematic diagram of widths and heights of an eyebrow, an eye, a nose, and a mouth in a method for generating a cartoon face image according to an exemplary embodiment of the present disclosure.

The width and the height of the eyebrow are a width and a height of a single eyebrow, and the width and the height of the eye are a width and a height of a single eye. Using the standard face image as an example, as shown in FIG. 8, the width of a single eyebrow may be obtained by calculating a difference between coordinates, which are on the x-axis, of a leftmost key location point and a rightmost key location point on a single eyebrow profile. That is, as shown in FIG. 8, the width of a single eyebrow is a length of a horizontal dashed line at lire eyebrow. The height of a single eyebrow may be obtained by calculating a difference between coordinates, which are on the y-axis, of a highest key location point and a lowest key location point on the single eyebrow profile. That is, as shown in FIG. 8, the height of a single eyebrow is a length of a vertical dashed line at the eyebrow. Similarly, the width of a single eye may be obtained by calculating a difference between coordinates, which are on the x-axis, of a leftmost key location point and a rightmost key location point on a single eye profile. That is, as shown in FIG. 8, the width of a single eye is a length of a horizontal dashed line at the eye. The height of a single eye may be obtained by calculating a difference between coordinates, which are on the y-axis, of a highest key location point and a lowest key location point on the single eye profile. That is, as shown in FIG. 8, the height of a single eye is a length of a vertical dashed line at the eye. The width of a mouth may be obtained by calculating a difference between coordinates, which are on the x-axis, of a leftmost key location point and a rightmost key location point on a mouth profile. That is, as shown in FIG. 8, the width of a mouth is a length of a horizontal dashed line at the mouth. The height of a mouth may be obtained by calculating a difference between coordinates, which are on the y-axis, of a highest key location point and a lowest key location point on the mouth profile. That is, as shown in FIG. 8, the height of a mouth is a length of a vertical dashed line at the mouth. The width of a nose may be obtained by calculating a difference between coordinates, which are on the x-axis, of a leftmost key location point and a rightmost key location point on a nose profile. That is, as shown in FIG. 8, the width of a nose is a length of a horizontal dashed line at the nose.

The width occupation ratios of the eyebrows, the eyes, the nose, and the mouth are ratios of the widths of the corresponding organs to the width of the face shape. For example, the first width occupation ratio of the eyebrow of the to-be-processed face image is a ratio of the width of the eyebrow to the width of the face shape. The height occupation ratios of the eyebrows, the eyes, and the mouth are ratios of the height of the corresponding organs to the height of the face shape. For example, the first height occupation ratio of the eyebrow of the to-be-processed face image is a ratio of the height of the eyebrow to the height of the face shape.

The width scaling ratio is a ratio of the first width occupation ratio of a facial feature of the to-be-processed face image to the second width occupation ratio of a facial feature of the standard face image. For example, the width scaling ratio of the eyebrow material is a ratio of the first width occupation ratio of the eyebrow of the to-be-processed face image to the second width occupation ratio of the eyebrow of the standard face image. The scaling ratio of the eyebrow material is a ratio of the first width occupation ratio of the eye of the to-be-processed face image to the second width occupation ratio of the eye of the standard face image, and so on.

The height scaling ratio is a ratio of the first height occupation ratio of a facial feature of the to-be-processed face image to the second height occupation ratio of a facial feature of the standard face image. For example, the height scaling ratio of the eyebrow material is a ratio of the first height occupation ratio of the eyebrow of the to-be-processed face image to the second height occupation ratio of the eyebrow of the standard face image. The scaling ratio of the eyebrow material is a ratio of the first height occupation ratio of the eye of the to-be-processed face image to the second height occupation ratio of the eye of the standard face image, and so on.

Through the foregoing steps, the width scaling ratios and the height scaling ratios of the cartoon facial feature materials may be obtained.

Obtaining the horizontal offset ratios of the eyebrow material and the eye material and the vertical offset ratios of the eyebrow material, the nose material, and the mouth material may include the following additional sub-steps.

In a first additional sub-step, eyebrow distance between the two eyebrows of the to-be-processed face image and an eye distance between the two eyes of the to-be-processed face image are obtained according to coordinates of key location points on an eyebrow profile and an eye profile of the to-be-processed face image.

In a second additional sub-step, first horizontal distance ratios of the eyebrow and the eye of the to-be-processed face image are obtained according to the eyebrow distance and the eye distance of the to-be-processed face image and the width of the face shape of the to-be-processed face image.

In a third additional sub-step, an eyebrow distance between the two eyebrows of the standard face image and an eye distance between the two eyes of the standard face image are obtained according to coordinates of key location points on an eyebrow profile and an eye profile of the standard face image.

In a fourth additional sub-step, second horizontal distance ratios of the eyebrow and the eye of the standard face image are obtained according to the eyebrow distance and the eye distance of the standard face image and the width of the face shape of the standard face image.

Figure 9:
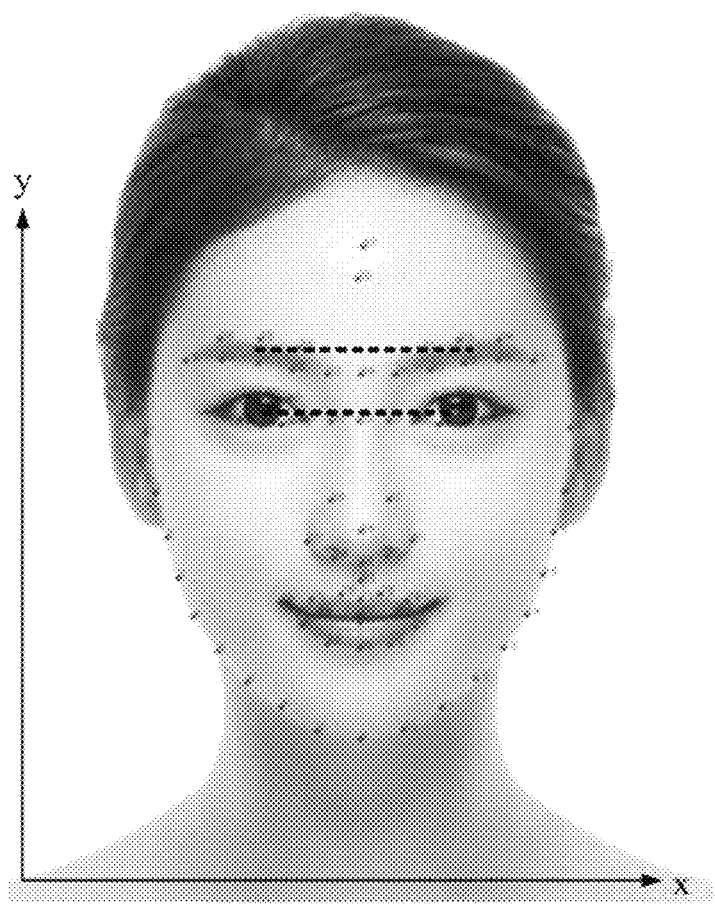
FIG. 9 is a schematic diagram of a distance between eyebrows and a distance between eyes in a method for generating a cartoon face image according to an exemplary embodiment of the present disclosure.

Using the standard face image as an example, the eyebrow distance between the eyebrows may be obtained by selecting center points of the two eyebrows to calculate a difference between coordinates, which are on the x-axis, of the two center points. That is, as shown in FIG. 9, the eyebrow distance may be a length of a horizontal dashed line between the eyebrows. The eye distance between the eyes may be obtained by selecting center points of the two eyes to calculate a difference between coordinates, which are on the x-axis of the two center points. That is, as shown in FIG. 9, the eye distance may be a length of a horizontal dashed line between the eyes. The horizontal distance ratio of the eyebrow may be a ratio of the eyebrow distance of the eyebrows to the width of the face shape. The horizontal distance ratio of the eye may be a ratio of the eye distance of the eyes to the width of the face shape.

In a fifth additional sub-step, vertical distances, which are relative to the face reference points in the to-be-processed face image, of the eyebrow, the nose, and the mouth of the to-be-processed face image are obtained according to the coordinates of the key location points on the eyebrow profile, the nose profile, and the mouth profile of the to-be-processed face image and the coordinates of the face reference points of the to-be-processed face image.

In a sixth additional sub-step, first vertical distance ratios of the eyebrow, the nose, and the mouth of the to-be-processed face image are obtained according to the vertical distances, which are relative to the face reference points in the to-be-processed face image, of the eyebrow, the nose, and the mouth of the to-be-processed face image and the height of the face shape of the to-be-processed face image.

In a seventh additional sub-step, vertical distances, which are relative to the face reference points in the standard face image, of the eyebrow, the nose, and the mouth of the standard face image are obtained according to the coordinates of the key location points on the eyebrow profile, the nose profile, and the mouth profile of standard face image and the coordinates of the face reference points of the standard face image.

In an eighth additional sub-step, second vertical distance ratios of the eyebrow, the nose, and the mouth of the standard face image are obtained according to the vertical distances, which are relative to the face reference points in the standard face image, of the eyebrow, the nose, and the mouth of the standard face image and the height of the face shape of the standard face image.

Figure 10:
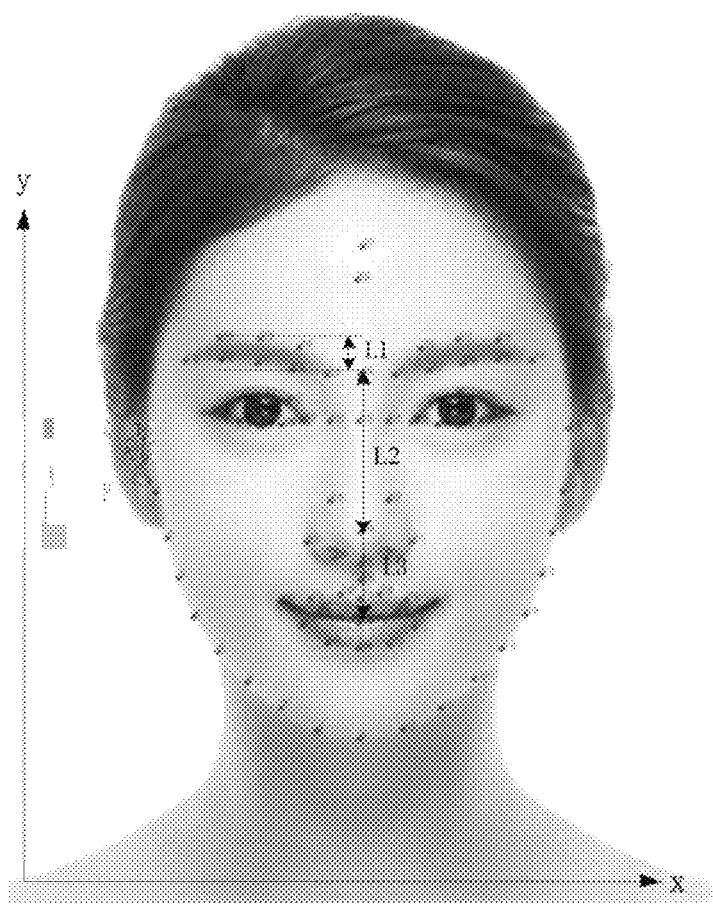
FIG. 10 is a schematic diagram of vertical distances of an eyebrow, a nose, and a mouth relative to face reference points in a method for generating a cartoon face image according to an exemplary embodiment of the present disclosure.

The vertical distances, which are relative to the face reference points, of the eyebrow, the nose, and the mouth may separately be a distance, which is in a vertical direction, between the face reference point A and one of the key location points on the corresponding organ profile. The key location point may be selected according to an actual requirement. Using the standard face image as an example, as shown in FIG. 10, a vertical distance, which is relative to the face reference point A, of the eyebrow may be obtained by selecting a highest location point on the eyebrow and calculating a difference between coordinates, which are on the y-axis, of the highest location point and the face reference point A. That is, the vertical distance is L1 shown in FIG. 10. A vertical distance, which is relative to the face reference point A, of the nose may be obtained by selecting a nose tip and calculating a difference between coordinates, which are on the y-axis, of the nose tip and the face reference point A. That is, the vertical distance is L2 shown in FIG. 10. A vertical distance, which is relative to the face reference point A, of the mouth may be obtained by selecting a mouth center point calculating a difference between coordinates, which are on the y-axis, of the mouth center point and the face reference point A. That is, the vertical distance is L3 shown in FIG. 10.

The vertical distance ratios of the eyebrow, the nose, and the mouth are respectively ratios of the vertical distances, which are relative to the face reference point A, of the corresponding organs to the height of the face shape. For example, a ratio of the vertical distance, which is relative to the face reference point A, of the eyebrow to the height of the face shape is the vertical distance ratio of the eyebrow. A ratio of the vertical distance, which is relative to the face reference point A, of the nose to the height of the face shape is the vertical distance ratio of the nose. A ratio of the vertical distance, which is relative to the face reference point A, of the mouth to the height of the face shape is the vertical distance ratio of the mouth.

In a ninth additional sub-step, the horizontal offset ratios of the eyebrow material and the eye material are obtained according to the first horizontal distance ratios and the second horizontal distance ratios, and the vertical offset ratios of the eyebrow material, the nose material, and the mouth material are obtained according to the first vertical distance ratios and the second vertical distance ratios.

The horizontal offset ratio of the eyebrow material is a ratio of the first horizontal distance ratio of the eyebrow of the to-be-processed face image to the second horizontal distance ratio of the eyebrow of the standard face image. The horizontal offset ratio of the eye material is a ratio of the first horizontal distance ratio of the eye of the to-be-processed face image to the second horizontal distance ratio of the eye of the standard face image. The vertical offset ratio of the eyebrow material is a ratio of the first vertical distance ratio of the eyebrow of the to-be-processed face image to the second vertical distance ratio of the eyebrow of the standard face image. According to a similar principle, the vertical offset ratios of the nose material and the mouth material are obtained.

Through the foregoing steps, the offset ratios and the scaling ratios of the cartoon facial feature materials may be obtained, to obtain the adjustment parameter.

The coordinates, which are described in the foregoing steps, of the key location points (including the key location points on the facial feature profiles) on the face of the to-be-processed face image may be coordinates on which coordinate space conversion is performed through the transform matrix, that is, coordinates referring to a coordinate system in the standard face image. In an exemplary embodiment, the adjusting each material of the cartoon facial feature materials by using an adjustment parameter may specifically include the following sub-steps:

In a first sub-step, location information and, or size information of the cartoon facial feature materials, and location information and/or size information of standard cartoon facial feature parts of a preset standard cartoon face image are obtained. There is a mapping relationship between the standard face image and the standard cartoon face image. In an exemplary embodiment, a standard cartoon face image is preset, where there is a mapping relationship between the standard face image and the standard cartoon face image. The mapping relationship may be, for example, that locations and size ratios of facial features of the standard cartoon face image and the standard face image are consistent, or not consistent. For example, there may be a preset ratio relationship between the locations or the size ratios of the facial features of the standard cartoon face image and the standard face image.

Corresponding location information and size information are pre-stored for both the cartoon face materials of an exemplary embodiment and standard cartoon facial feature parts of the standard cartoon face image. That is, in the material library, corresponding location information and size information are preset for each cartoon face material such as the eyebrow material and the face shape material.

The size information is a width and a height. The size information and or location information of the obtained cartoon facial feature materials may include a height of the face shape material; a width and a location of the nose material; a width, a height, and a location of the eyebrow material, a width, a height, and a location of the eye material; and a width, a height, and a location of the mouth material. In this way, the location information and/or size information of each material of the cartoon facial feature materials are obtained. The size information and/or location information of the standard cartoon facial feature parts of the obtained standard cartoon face image may include a height of a face shape part in the standard cartoon facial feature parts; a width and a location of a nose part in the standard cartoon facial feature parts; a width, a height, and a location of an eyebrow part in the standard cartoon facial feature parts; a width, a height, and a location of an eye part in the standard cartoon facial feature parts; and a width, a height, and a location of a mouth part in the standard cartoon facial feature parts.

In a second sub-step, the height of the face shape material is adjusted according to the scaling ratio of the face shape material the size information of the face shape material, and the size information of the face shape part in the standard cartoon facial feature parts. Specifically, a ratio of the height of the face shape material to the height of the face shape part in the standard cartoon facial feature parts is calculated. When the ratio is not consistent with the scaling ratio of the face shape material, the height of the face shape material is adjusted, so that the ratio is consistent with the scaling ratio of the face shape material, thereby implementing adjustment of the height of the face shape material.

For example, a height scaling ratio of the face shape material is 1.2, the height of the face shape material is 50 pixels, and the height of the face shape part in the standard cartoon facial feature parts is 100 pixels. It can be learned that the ratio of the height of the face shape material to the height of the face shape part in the standard cartoon facial feature parts is not equal to the height scaling ratio of the face shape material. Therefore, the height of the face shape material is adjusted, and the height is increased by 70 pixels. That is, the height of the face shape material is increased to 120 pixels. The increased 70 pixels may be obtained through the following manner 100*1.2−50=70 pixels, in this way, the ratio of the height of the face shape material to the height of the face shape part in the standard cartoon facial feature parts is equal to the height scaling ratio of the face shape material.

In a third sub-step, a horizontal location, a vertical location, a width, and a height of the eyebrow material are adjusted according to an offset ratio and a scaling ratio of the eyebrow material, location information and size information of the eyebrow material, and location information and size information of an eyebrow part of the standard cartoon facial feature parts. Specifically, horizontal coordinates of the eyebrow material and the eyebrow part in the standard cartoon facial feature parts are obtained according to the location information of the eyebrow material and the location information of the eyebrow part in the standard cartoon facial feature parts. By adjusting the horizontal coordinates of the eyebrow material, a ratio of the horizontal coordinates of the eyebrow material to the horizontal coordinates of the eyebrow part in the standard cartoon facial feature parts is consistent with the horizontal offset ratio of the eyebrow material, thereby implementing adjustment of the horizontal location of the eyebrow material.

Similarly, vertical coordinates of the eyebrow material and the eyebrow part in the standard cartoon facial feature parts are obtained according to the location information of the eyebrow material and the location information of the eyebrow part in the standard cartoon facial feature pails. By adjusting the vertical coordinates of the eyebrow material, a ratio of the vertical coordinates of the eyebrow material to the vertical coordinates of the eyebrow part in the standard cartoon facial feature parts is consistent with the vertical offset ratio of the eyebrow material, thereby implementing adjustment of the vertical location of the eyebrow material. The width of the eyebrow material is adjusted according to the width of the eyebrow material and the width of the eyebrow part in the standard cartoon facial feature parts, so that a ratio of the width of the eyebrow material to the width of the eyebrow part in the standard cartoon facial feature parts is consistent with the width scaling ratio of the eyebrow material, thereby implementing adjustment of the width of the eyebrow material. The height of the eyebrow material is adjusted according to the height of the eyebrow material and the height of the eyebrow part in the standard cartoon facial feature parts, so that a ratio of the height of the eyebrow material to the height of the eyebrow part in the standard cartoon facial feature parts is consistent with the height scaling ratio of the eyebrow material, thereby implementing adjustment of the height of the eyebrow material.

In a fourth sub-step, a horizontal location, a height, and a width of the eye material are adjusted according to an offset ratio and a scaling ratio of the eye material, location information and size information of the eye material, and location information and size information of an eye part of the standard cartoon facial feature parts.

In a fifth sub-step, a vertical location and a width of the nose material are adjusted according to an offset ratio and a scaling ratio of the nose material, location information and size information of the nose material, and location information anti size information of a nose part of the standard cartoon facial feature parts.

In a sixth sub-step, a vertical location, a width, and a height of the mouth material are adjusted according to an offset ratio and a scaling ratio of the mouth material, location information and size information of the mouth material, and location information and size information of a mouth part of the standard cartoon facial feature parts.

For specific adjustment manners of steps (74), (75), and (76), refer to the adjustment manner of the location and the size of the eyebrow material above.

In an exemplary embodiment, to prevent the cartoon facial feature materials in the generated cartoon face image from being excessively exaggerated, before the adjusting by using the adjustment parameter, the offset ratio and/or the scaling ratio of each material of the cartoon facial feature materials are adjusted according to a preset weight, and each material is adjusted according to the adjusted offset ratio and/or the adjusted scaling ratio of each material.

The preset weight includes a scaling factor and an offset factor. The scaling factor and the offset factor may be set according to an actual requirement, for example, may be 0.1, 0.3, 0.6, or the like. The scaling factor is used for adjusting the scaling ratio (including the height scaling ratio and the width scaling ratio). For example, the scaling ratio of the cartoon facial feature material may be multiplied by the scaling factor, to obtain the adjusted scaling ratio of the cartoon facial feature material. The offset factor is used for adjusting the offset ratio (including the horizontal offset ratio and the vertical offset ratio) of the cartoon facial feature material. For example, the offset ratio of the cartoon facial feature material may be multiplied by the offset factor, to obtain the adjusted offset ratio of the cartoon facial feature material. In this way, the adjustment parameter of the cartoon facial feature material is adjusted, and the material is then adjusted based on the adjusted scaling ratio and the adjusted offset ratio.

In step 205, the other cartoon material is combined with the adjusted cartoon facial feature materials to generate a cartoon face image. The other cartoon material may be, for example, a cartoon glasses material, a cartoon back hair material, and a cartoon face wrinkle or nasolabial fold material. The cartoon face image is finally generated by combining the cartoon materials to form a cartoon face.

In an exemplary embodiment, the cartoon materials corresponding to the feature parts of the face in the to-be-processed face image are obtained according to the face feature information, and then the cartoon materials are combined to generate the cartoon face image. Because the cartoon materials of the feature parts are obtained one by one, the feature parts of the face in the generated cartoon face image may be independent of each other. In this way, an operation such as modification or replacement can be independently performed on a feature part in the cartoon face image subsequently without affecting another feature part, so that the operability of the cartoon face image is improved. In addition, when the materials of the cartoon facial feature materials are adjusted, one material is also prevented from being affected when another material is adjusted. In addition, after the cartoon materials of the feature parts are obtained one by one, another processing may alternatively be performed on the cartoon materials. For example, the cartoon materials may be used for producing a sticker set. As a result, the operability of the material is improved. In addition, the cartoon face image is combined and generated by obtaining the cartoon materials of the feature parts one by one, and this may further improve, compared with a manner of drawing based on an edge, the similarity of the cartoon face images. In addition, in this solution, after the cartoon materials of the feature parts are determined, each material of the cartoon facial feature materials is adjusted by using the adjustment parameter, so that the cartoon facial feature materials are more similar to real facial features, thereby further improving the similarity between the cartoon face image and the to-be-processed face image.

In an exemplary embodiment, after step 205, in which the cartoon face image is generated, the generated cartoon face image is displayed to a user for watching. Simultaneously, various cartoon face materials may further be displayed on a display interface. Because the generated cartoon face image is generated by obtaining the cartoon materials of the feature parts of the face of the to-be-processed face image, and combining the cartoon materials, the feature parts of the cartoon face image are independent of each other. The user may select a cartoon face material to replace a corresponding part in the generated cartoon face image without affecting another feature part, thereby improving the operability of the cartoon face image. When the user selects a cartoon face material, for example, the eyebrow material, the eyebrow material selected by the user is adjusted by using the height scaling ratio, the width scaling ratio, the horizontal offset ratio, and the vertical offset ratio, which are obtained in the exemplary embodiment shown in FIG. 2a, of the eyebrow material and according to the eyebrow material selected by the user. For the specific adjustment manner, refer to the exemplary embodiment shown in FIG. 2a, and details are not described herein one by one again. In this way, the cartoon face material of the same type is adjusted by using the same scaling ratio and the same offset ratio, so that it may be determined that facial features of the cartoon face image obtained after the user selects a different cartoon material still stays in the fixed location and maintains the fixed size ratio.

In an exemplary embodiment, the adjustment parameter of the cartoon facial feature materials may alternatively be a preset adjustment parameter. Specifically, an offset ratio and/or scaling ratio may be preset for each cartoon material in the material library. For example, a corresponding offset ratios and scaling ratio are set for each eyebrow material, a corresponding height scaling ratio is set for each face shape material, and so on. The offset ratio and the scaling ratio of each cartoon material may be set according to an actual situation. Therefore, in an exemplary embodiment, to obtain the adjustment parameter, a preset offset ratio and/or a preset scaling ratio of each material of the cartoon facial feature materials is obtained according to the cartoon facial feature materials, to obtain the adjustment parameter. After the adjustment parameter is obtained, each material of the cartoon facial feature materials may be adjusted according to the sub-steps described above.

In an exemplary embodiment, the offset ratio and/or the scaling ratio of each material of the cartoon facial feature materials may alternatively be obtained directly according to the facial feature profile information of the to-be-processed face image, to obtain the adjustment parameter. Specifically, in an exemplary embodiment, the adjusting each material of the cartoon facial feature materials by using an adjustment parameter may include the following sub-steps.

In a first sub-step, a width and a height of the face shape of the to-be-processed face image are obtained according to coordinates of key location points on a face profile of the to-be-processed face image and the coordinates of the face reference point of the to-be-processed face image, and an aspect ratio of the face shape of the to-be-processed face image is obtained according to the width and the height of the face shape of the to-be-processed image. The aspect ratio is a ratio of the width of the face shape to the height of the face shape.

In a second sub-step, widths and heights of the eyebrows, the eyes, and the mouth in the to-be-processed face image and the width of the nose in the to-be-processed face image are obtained according to coordinates of key location points on the profiles of the eyebrows, the eyes, the nose, and the mouth in the to-be-processed face image.

In a third sub-step, width occupation ratios of the eyebrows, the eyes, the nose, and the mouth of the to-be-processed face image are obtained according to the widths of the eyebrows, the eyes, the nose, and the mouth of the to-be-processed face image and the width of the face shape of the to-be-processed face image. The width occupation ratios of the organ parts are respectively ratios of the widths of the organs parts to the width of the face shape.

In a fourth sub-step, height occupation ratios of the eyebrows, the eyes, and the mouth of the to-be-processed face image are obtained according to the heights of the eyebrows, the eyes, and the month of the to-be-processed face image and the height of the face shape of the to-be-processed face image. The height occupation ratios of the organ parts are respectively ratios of the heights of the organs parts to the height of the face shape.

In a fifth sub-step, an eyebrow distance between the two eyebrows of the to-be-processed face image and an eye distance between the two eyes of the to-be-processed face image are obtained according to coordinates of key location points on an eyebrow profile and an eye profile of the to-be-processed face image, and horizontal distance ratios of the eyebrow and the eye of the to-be-processed face image are obtained according to the eyebrow distance and the eye distance of the to-be-processed image and the width of the face shape of the to-be-processed face image. The horizontal distance ratio of the eyebrow is a ratio of the eyebrow distance to the width of the face shape. The horizontal distance ratio of the eye is a ratio of the eye distance to the width of the face shape.

In a sixth sub-step, vertical distances, which are relative to the face reference points in the to-be-processed face image, of the eyebrow, the nose, and the mouth of the to-be-processed face image are obtained according to the coordinates of the key location points on the eyebrow profile, the nose profile, and the mouth profile of the to-be-processed face image and the coordinates of the face reference points of the to-be-processed face image, and vertical distance ratios of the eyebrow, the nose, and the mouth of the to-be-processed face image are obtained according to the vertical distances, which are relative to the face reference points in the to-be-processed face image, of the eyebrow, the nose, and the mouth of the to-be-processed face image and the height of the face shape of the to-be-processed face image. The vertical distance ratios of the organ parts are respectively ratios of the vertical distances, which is relative to the face reference point, of the corresponding organs to the height of the face shape.

Therefore, the adjustment parameter of the exemplary embodiment includes the aspect ratio of the face shape, the width occupation ratios of the eyebrows, the eyes, the nose, and the mouth, the height occupation ratios of the eyebrows, the eyes, and the mouth, the horizontal distance ratios of the eyebrows and the eyes, and the vertical distance ratios of the eyebrows, the nose, and the mouth. Further, when each material of the cartoon facial feature materials is adjusted by using the adjustment parameter, the method of the exemplary embodiment may further include the following sub-steps.

In a first sub-step, location information and/or size information of the cartoon facial feature materials is obtained. The size information of a material includes a height and a width. Specifically, the location information and/or size information of the cartoon facial feature materials include the height of the face shape material, the width and the location of the nose material, and the widths, the heights, and the locations of the eyebrow material, the eye material, and the mouth material. In addition, locations of the face reference points on the face shape material are further obtained.

In a second sub-step, the height of the face shape material is adjusted so that the adjusted aspect ratio of the face shape material is live same as the aspect ratio of the face shape of the to-be-processed face image, thereby implementing adjustment of the height of the face shape material.

In a third sub-step, the widths of the eyebrow material, the eye material, the nose material, and the mouth material are adjusted so that the adjusted width occupation ratios of the eyebrow material, the eye material, the nose material, and the mouth material are correspondingly the same as the width occupation ratios of the eyebrow, the eye, the nose, and the mouth of the to-be-processed face image, thereby implementing adjustment of the widths of the eyebrow material, the eye material, the nose material, and the mouth material.

In a fourth sub-step, the heights of the eyebrow material, the eye material, and the mouth material are adjusted so that the adjusted height occupation ratios of the eyebrow material, the eye material, and the mouth material are correspondingly the same as the height occupation ratios of the eyebrow, the eye, and the mouth of the to-be-processed face image, thereby implementing adjustment of the heights of the eyebrow material, the eye material, and the mouth material.

In a fifth sub-step, the eyebrow distance of the eyebrow material and the eye distance of the eye material is adjusted so that the adjusted horizontal distance ratio of the eyebrow material is the same as the horizontal distance ratio of the eyebrow of the to-be-processed image, and the adjusted horizontal distance ratio of the eyebrow material is the same as the horizontal distance ratio of the eye of the to-beprocessed face image, thereby implementing adjustment of the horizontal locations of the eyebrow material and the eye material.

In a sixth sub-step, the vertical distances, which are relative to the face reference points in the face shape material, of the eyebrow material, the nose material, and the mouth material are adjusted so that the adjusted vertical distance ratio of the eyebrow material is the same as the vertical distance ratio of the eyebrow of the to-be-processed face image, the adjusted vertical distance ratio of the nose material is the same as the vertical distance ratio of the nose of the to-be-processed face image, and the adjusted vertical distance ratio of the mouth material is the same as the vertical distance ratio of the mouth of the to-be-processed face image, thereby implementing adjustment of the vertical locations of the eyebrow material, the nose material, and the mouth material.

In an exemplary embodiment, the locations and the size ratios of the facial features of the to-be-processed face image are directly mapped to the cartoon face image, so that the locations and the size ratios of the facial features of the cartoon face image are the same as the locations and the size ratios of the facial features of the to-be-processed face image, and as a result, the generated cartoon face image is more similar to the to-be-processed face image, and the similarity is improved.

An exemplary embodiment of the present disclosure provides an apparatus for generating a cartoon face image. The apparatus for generating a cartoon face image may be overall integrated in a terminal, or may be a system including a server and a terminal. In an exemplary embodiment, a description is made by using an example in which the apparatus is integrated in a terminal.

Figure 11:
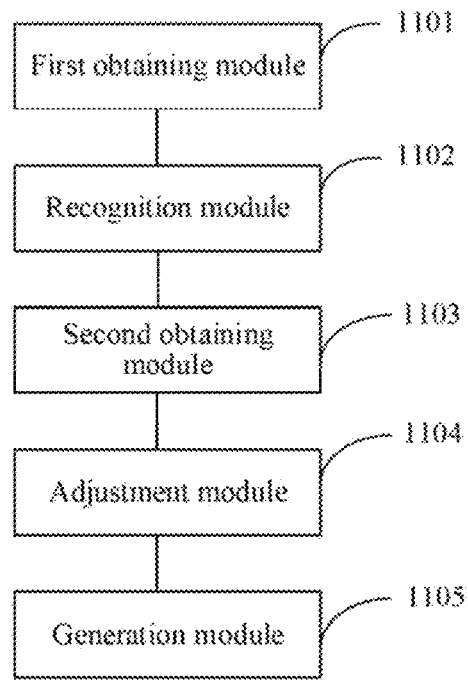
FIG. 11 is a schematic structural diagram of an apparatus for generating a cartoon face image according to an exemplary embodiment of the present disclosure.

Referring to FIG. 11, the apparatus for generating a cartoon face image of the exemplary embodiment includes a first obtaining module 1101, a recognition module 1102, a second obtaining module 1103, an adjustment module 1104, and a generation module 1105. One of ordinary skill will recognize that these modules may be implemented by circuitry that performs functions described below.

The first obtaining module 1101 is configured to obtain a to-be-processed face image. Specifically, the first obtaining module 1101 may be configured to obtain an input image, recognize a body region in the input image by using a fully convolutional network model, and remove a background region, which is other than the body region, from the input image, to further obtain the to-be-processed face image. The input image may be, for example, a selfie of a user, or a photo selected from an album by the user, or may be a photo downloaded from the network, or the like. The background region is removed by dividing the input image into the background region and the body region, so that an image of the background region is prevented from interfering with face detection, thereby improving the accuracy of face detection.

The recognition module 1102 is configured to recognize face feature information from the to-be-processed face image, where the face feature information includes facial feature information. Specifically, the recognition module 1102 may be configured to obtain facial feature information and hairstyle information of the to-be-processed face image by using a multi-task convolutional neural network (CNN) model, obtain gender information, age information, glasses information, hair color information and hair length information of the to-be-processed face image by using a face attribute recognition network model, to obtain face attribute information, to obtain the face feature information according to the facial feature information, the hairstyle information, and the face attribute information. That is, in an exemplary embodiment, the face feature information includes the facial feature information, the hairstyle information, and the face attribute information.

The second obtaining module 1103 configured to obtain cartoon materials corresponding to feature parts of a face in the to-be-processed face image according to the face feature information, to obtain cartoon face materials. The cartoon face materials include cartoon facial feature materials and another cartoon material other than the cartoon facial feature materials. Shapes of a face shape, eyebrows, eyes, a nose, and a mouth of the face in the to-be-processed face image may be determined according to the facial feature information in the face feature information, and a hairstyle shape of the face in the to-be-processed face image may be determined according to the hairstyle information, so that the cartoon materials of the feature parts of the face may be determined from a material library.

Further, the second obtaining module 1103 is configured to obtain a cartoon hairstyle material according to the hairstyle information, the hair color information, and the hair length information. The cartoon hairstyle material includes a cartoon back hair material in a case that the hair length information indicates long hair. The second obtaining module 1103 may also obtain a cartoon glasses material according to the glasses information in a case that the glasses information indicates that glasses are worn, and obtain a cartoon face wrinkle or nasolabial fold material, or a cartoon wrinkle material, according to the age information in a case that the age information indicates an age that is greater than a preset age. Therefore, in an exemplary embodiment, the cartoon hairstyle material, the cartoon facial features (the face shape, the eyebrows, the eyes, the nose, and the mouth), the cartoon glasses material, the cartoon back hair material, the cartoon wrinkle material, and the like may be determined according to the face feature information.

A hair shape material such as a center parting hair material or a straight bangs hair material may be first determined according to the hairstyle information, then a hair color material is determined according to the hair color information, so that the hair color material and the hair shape material are combined, to obtain a cartoon hairstyle material corresponding to the hairstyle and the hair color of the to-be-processed face image. In addition, the hair length information is information representing whether the hair in the to-be-processed face image is long hair or short hair. When the hair length information indicates long hair, the cartoon back hair material is selected, where the cartoon hairstyle material includes the cartoon back hair material. Otherwise, when the hair length information indicates short hair, no cartoon back hair material is added.

Because a variation range of the hairstyle is relatively large, in an exemplary embodiment, the hair shape material corresponding to the hairstyle information is determined by using a multi-level hairstyle recognition manner from a coarse granularity to a fine granularity. For example, a cartoon hairstyle large category to which the hairstyle in the to-be-processed face image belongs may be determined according to the hairstyle information, that is, coarse granularity recognition. Then the hairstyle in the to-be-processed face image is matched with a plurality of hair shape materials in the cartoon hairstyle large category one by one, to further determine the hair shape material according to a matching result.

The adjustment module 1104 is configured to adjust each material of the cartoon facial feature materials by using an adjustment parameter. In an exemplary embodiment, the adjustment parameter may be obtained through facial feature profile information of the to-be-processed face image and facial feature profile information of a preset standard face image. The adjustment module 1104 may be specifically configured to obtain facial feature profile information of the to-be-processed face image and facial feature profile information of a preset standard face image, and obtain an offset ratio and/or a scaling ratio of each material of the cartoon facial feature materials according to the facial feature profile information, to obtain the adjustment parameter.

The facial feature profile information of the to-be-processed face image and the facial feature profile information of the standard face image are obtained by respectively obtaining coordinates of key location points on profiles of a face shape, eyebrows, eyes, a nose, and a mouth of the to-be-processed face image and coordinates of key location points on profiles of a face shape, eyebrows, eyes, a nose, and a mouth of the preset standard face image. In addition, aside from the key location points on the facial feature profile, a plurality of key location points between the eyebrows, a plurality of key location points between the eyes, and a plurality of key location points on a forehead are further determined. The facial feature profile information of the standard face image is obtained by obtaining the coordinates of the key location points (including the key location points on the facial feature profile) on the face in the standard face image.

After obtaining the facial feature profile information of the to-be-processed face image and the facial feature profile information of the standard face image, the adjustment module 1104 is further configured to determine a transform matrix according to a preset organ part of the to-be-processed face image, and coordinates of key location points on profiles of corresponding organ parts in the standard face image, and convert, by using the transform matrix, the coordinates of the key location points on the profiles of the face shape, the eyebrows, the eyes, the nose, and the mouth of the to-be-processed face image into coordinates in a coordinate space of the standard face image, to adjust the facial feature profile information of the to-be-processed face image. For example, the preset organ part may be the eyes. Using a key location point on an eye profile as a standard, coordinates of a key location point on the eye profile of the to-be-processed face image are translated and scaled by using the least square method, so that the coordinates are converted into the coordinate space of the standard face image. A conversion result may be a shortest distance between the key location point on the eye profile of the to-be-processed face image and a corresponding key location point of an eye profile of the standard face image. As a result, a coordinate space transform matrix of the key location points on the face in the to-be-processed face image may be determined. In this way, by using the transform matrix, the coordinates of the key location points on the face in the to-be-processed face image are all converted into the coordinates in the coordinate space of the standard face image, so that coordinate conversion is performed. The adjustment module 1104 is specifically configured to obtain an offset ratio and/or a scaling ratio of each material of the cartoon facial feature materials according to the adjusted facial feature profile information of the to-be-processed face image, to obtain the adjustment parameter.

The adjustment module 1104 is configured to obtain a height scaling ratio of a face shape material of the cartoon facial feature materials, and obtain a horizontal offset ratio, a vertical offset ratio, a height scaling ratio, and a width scaling ratio of an eyebrow material of the cartoon facial feature materials. The adjustment module 1104 also obtains a horizontal offset ratio, a height scaling ratio, and a width scaling ratio of an eye material of the cartoon facial feature materials, obtains a vertical offset ratio and a width scaling ratio of a nose material of the cartoon facial feature materials, and obtains a vertical offset ratio, a height scaling ratio, and a width scaling ratio of a mouth material of the cartoon facial feature materials, to obtain the adjustment parameter.

The adjustment module 1104 is configured to obtain location information and/or size information of the cartoon facial feature materials, and location information and/or size information of standard cartoon facial feature parts of a preset standard cartoon face image, and adjust the height of the face shape material according to the scaling ratio of the face shape material, the size information of the face shape material, and the size information of the face shape part in the standard cartoon facial feature parts. The adjustment module 1104 also adjusts a horizontal location, a vertical location, a width, and a height of the eyebrow material according to an offset ratio and a scaling ratio of the eyebrow material, location information and size information of the eyebrow material, and location information and size information of an eyebrow part of the standard cartoon facial feature parts. The adjustment module 1104 further adjusts a horizontal location, a height, and a width of the eye material according to an offset ratio and a scaling ratio of the eye material, location information and size information of the eye material, and location information and size information of an eye part of the standard cartoon facial feature parts, and adjusts a vertical location and a width of the nose material according to an offset ratio and a scaling ratio of the nose material, location information and size information of the nose material, and location information and size information of a nose part of the standard cartoon facial feature parts. The adjustment module 1104 adjusts a vertical location, a width, and a height of the mouth material according to an offset ratio and a scaling ratio of the mouth material, location information and size information of the mouth material, and location information and size information of a mouth part of the standard cartoon facial feature parts.

The generation module 1105 is configured to combine the other cartoon material with the adjusted cartoon facial feature materials, to generate a cartoon face image. The other cartoon material may be, for example, a cartoon glasses material, a cartoon back hair material, and a cartoon face wrinkle or nasolabial fold material. The cartoon face image is finally generated by combining the cartoon materials to form a cartoon face.

In an exemplary embodiment, the cartoon materials corresponding to the feature parts of the face in the to-be-processed face image are obtained according to the face feature information, and then the cartoon materials are combined to generate the cartoon face image. Because the cartoon materials of the feature parts are obtained one by one, the feature parts of the face in the generated cartoon face image may be independent of each other. In this way, an operation such as modification or replacement can be independently performed on a feature part in the cartoon face image subsequently without affecting another feature part, so that the operability of the cartoon face image is improved. In addition, when the materials of the cartoon facial feature materials are adjusted, one material is also prevented from being affected when another material is adjusted. In addition, after the cartoon materials of the feature parts are obtained one by one, another processing may alternatively be performed on the cartoon materials. For example, the cartoon materials may be used for producing a sticker set. As a result, the operability of the material is improved. In addition, the cartoon face image is combined and generated by obtaining the cartoon materials of the feature parts one by one, and this may further improve, compared with a manner of drawing based on an edge, the similarity of the cartoon face images. In addition, in an exemplary embodiment, after the cartoon materials of the feature parts are determined, each material of the cartoon facial feature materials is adjusted by using the adjustment parameter, so that the cartoon facial feature materials are more similar to real facial features, thereby further improving the similarity between the cartoon face image and the to-be-processed face image.

In an exemplary embodiment, the adjustment module 1104 may be configured to obtain, according to the cartoon facial feature materials, a preset offset ratio and/or a preset scaling ratio of each material of the cartoon facial feature materials, to obtain the adjustment parameter; and adjust each material of the cartoon facial feature materials according to the obtained adjustment parameter.

Figure 12A:
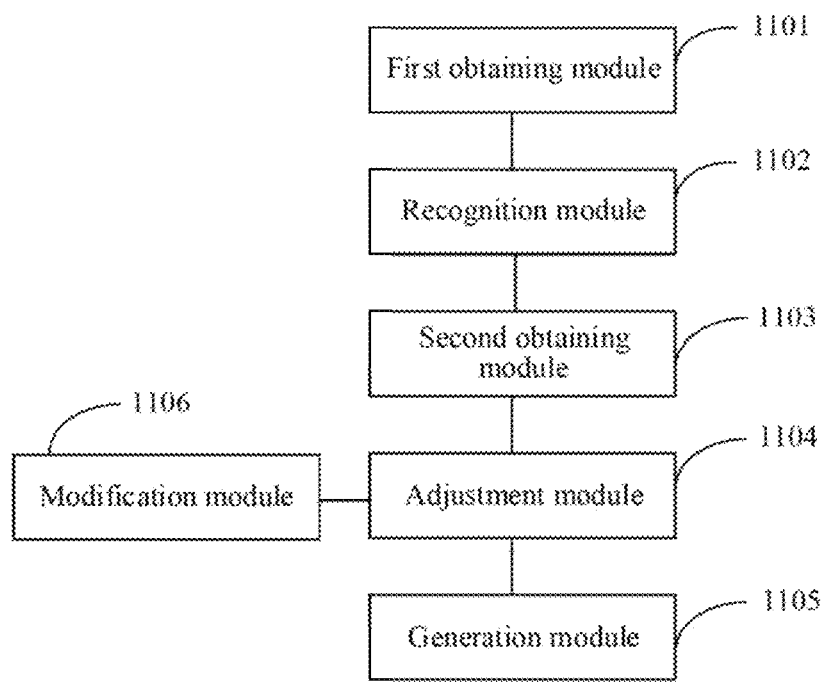
FIG. 12A is another schematic structural diagram of an apparatus for generating a cartoon face image according to an exemplary embodiment of the present disclosure.

Further, as shown in FIG. 12A, the apparatus for generating a cartoon face image of this application may include a modification module 1106. The modification module 1106 is configured to adjust, before the adjustment module 1104 adjusts the materials by using the adjustment parameter, the offset ratio and/or the scaling ratio of each material of the cartoon facial feature materials according to a preset weight, so that the adjustment module 1104 adjusts each material according to the adjusted offset ratio and or the adjusted scaling ratio of each material.

The preset weight includes a scaling factor and an offset factor. The scaling factor and the offset factor may be set according to an actual requirement, for example, may be 0.1, 0.3, 0.6, or the like. The scaling factor is used for adjusting the scaling ratio (including the height scaling ratio and the width scaling ratio). For example, the scaling ratio of the cartoon facial feature material may be multiplied by the scaling factor, to obtain the adjusted scaling ratio of the cartoon facial feature material. The offset factor is used for adjusting the offset ratio (including the height offset ratio and the width offset ratio) of the cartoon facial feature material. For example, the offset ratio of the cartoon facial feature material may be multiplied by the offset factor, to obtain the adjusted offset ratio of the cartoon facial feature material. In this way, the adjustment parameter of the cartoon facial feature material is adjusted, and the material is then adjusted based on the adjusted scaling ratio and the adjusted offset ratio. By adjusting the offset ratios and the scaling ratios, the cartoon facial feature materials in the generated cartoon face image are prevented from being excessively exaggerated.

Figure 12B:
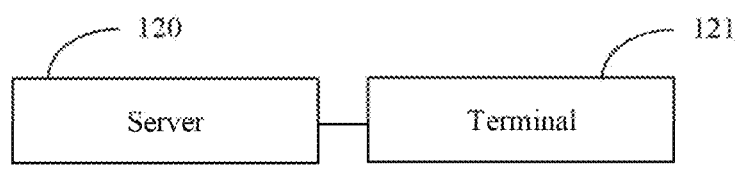
FIG. 12B is another schematic structural diagram of an apparatus for generating a cartoon face image according to an exemplary embodiment of the present disclosure.

In an exemplary embodiment of this application, as shown in FIG. 12B, the apparatus for generating a cartoon face image may be a system. The system includes a server 120 and a terminal 121. The first obtaining module 1101 and the recognition module 1102 may be integrated in the server 120, and the second obtaining module 1103, the adjustment module 1104, and the generation module 1105 may be integrated in the terminal 121.

The server is configured to receive an input image transmitted by the terminal, segment a background and a body region in the input image, to obtain the to-be-processed face image, obtain face feature information in the to-be-processed face image, determine cartoon face materials according to the face feature information, and return the cartoon face materials to the terminal. The terminal is mainly configured to obtain an adjustment parameter to adjust cartoon facial feature materials, to generate a cartoon face image according to the adjusted cartoon facial feature materials and another cartoon material. An amount of calculation of the terminal may be reduced by integrating the first obtaining module and the recognition module in the server.

In an exemplary embodiment, the adjustment module may be configured to obtain facial feature profile information of the to-be-processed face image, and obtain the adjustment parameter directly according to the facial feature profile information of the to-be-processed face image. The adjustment parameter is, for example, the aspect ratio of the face shape, the width occupation ratios of the eyebrows, the eyes, the nose, and the mouth, the height occupation ratios of the eyebrows, the eyes, and the mouth, the horizontal distance ratios of the eyebrows and the eyes, and the vertical distance ratios of the eyebrows, the nose, and the mouth. As a result, the adjustment module adjusts each material of the cartoon facial feature materials according to the adjustment parameter, and the location information and the size information of the cartoon facial feature materials.

Figure 13:
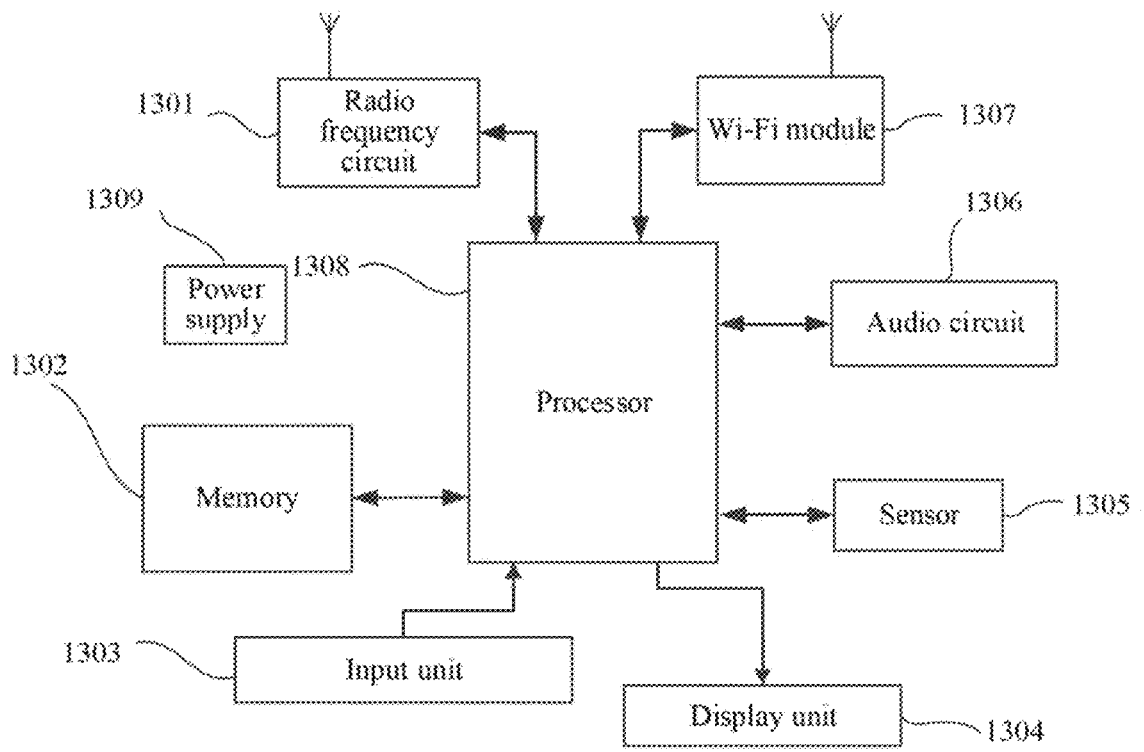
FIG. 13 is a schematic structural diagram of a terminal according to an exemplary embodiment of the present disclosure.

Correspondingly, an exemplary embodiment of the present disclosure further provides a terminal. As shown in FIG. 13, the terminal may include components such as a radio frequency (RF) circuit 1301, a memory 1302 including one or more computer-readable storage media, an input unit 1303, a display unit 1304, a sensor 1305, an audio circuit 1306, a Wi-Fi module 1307, a processor 1308 including one oi more processing cores, and a power supply 1309. A person skilled in the an may understand that a terminal structure shown in FIG. 13 constitutes no limitation on the terminal, and the terminal may include more or fewer components than those shown in the figure, or some components may be combined, or a different component deployment may be used.

The RF circuit 1301 may be configured to receive and transmit a signal during an information receiving and transmitting process or a call process. Specifically, the RF circuit receives downlink information from a base station, then delivers the downlink information to one or more processors 1308 for processing, and transmits related uplink data to the base station. Generally, the RF circuit 1301 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 1301 may further communicate with other devices via wireless communication and a network. The wireless communication may use any communication standard or protocol, including but not limited to the Global System of Mobile Communication (GSM), general packet radio service (GPRS), and Code Division Multiple Access (CDMA), Wideband Code Division Multiple Access (WCDMA), Long Term Evolution (LTE), email, short messaging service (SMS), and the like.

The memory 1302 is a circuit configured to store a software program and module. The processor 1308 runs the software program and module stored in the memory 1302, to execute various functional applications and data processing. The memory 1302 may mainly include a program storage area and a data storage area. The program storage area may store an operating system, an application program required by at least one function (such as a sound playback function and an image display function), and the like. The data storage area may store data (such as audio data and an address book) created according to the use of the terminal, and the like. In addition, the memory 1302 may include a high speed random access memory, and may also include a non-volatile memory, such as at least one magnetic disk storage device, a flash memory, or another volatile solid-state storage device. Accordingly, the memory 1302 may further include a memory controller to provide access to the memory 1302 by the processor 1308 and the input unit 1303.

The input unit 1303 is a circuit configured to receive information about an input number or character, and generate input of a keyboard, a mouse, a joystick, an optical or trackball signal that are related to user settings and function control. Specifically, in a specific embodiment, the input unit 1303 may include a touch-sensitive surface and other input devices. The touch-sensitive surface, which may also be referred to as a touch screen or a touch panel, may collect a touch operation of a user on or near the touch-sensitive surface (such as an operation of a user on or near the touch-sensitive surface by using any suitable object or accessory such as a finger or a stylus), and drive a corresponding connection apparatus according to a preset program. In an embodiment of this application, the touch-sensitive surface may include a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 1308. Moreover, the touch controller can receive and execute a command sent from the processor 1308. In addition, the touch-sensitive surface may be implemented in multiple types, such as a resistive type, a capacitive type, an infrared type, and a surface acoustic wave type. Except the touch-sensitive surface, the input unit 1303 may further include other input devices. Specifically, other input devices may include but are not limited to one or more of a physical keyboard, a function key (such as a volume control key, a switch key, and the like), a trackball, a mouse, a joystick, and the like.

The display unit 1304 is a circuit configured to display information input by the user or provided to the user, and various graphical user interfaces of the terminal. These graphical user interfaces may be composed of graphics, text, icons, videos, and any combination thereof. The display unit 1304 may include a display panel. Alternatively, the display panel may be configured in the form of a liquid crystal display (LCD), an organic light-emitting diode (OLED), or the like. Further, the touch-sensitive surface may cover the display panel. After detecting a touch operation on or near the touch-sensitive surface, the touch-sensitive surface transfer the touch operation to the processor 1308 to determine a type of a touch event, and then the processor 1308 provides corresponding visual output on the display panel according to the type of the touch event. Although in FIG. 13, the touch-sensitive surface and the display panel are used as two separate parts to implement input and output functions, in some embodiments, the touch-sensitive surface and the display panel may be integrated to implement the input and output functions.

The terminal may further include at least one sensor 1305, such as an optical sensor, a motion sensor, and other sensors. Specifically, the optical sensor may include an ambient light sensor and a proximity sensor, where the ambient light sensor may adjust brightness of the display panel according to brightness of the ambient light, and the proximity sensor may turn off the display panel and/or backlight when the terminal moves to an ear. As one type of the motion sensor, a gravity acceleration sensor may detect a value of acceleration at each direction (which is generally triaxial), may detect a value and a direction of the gravity when being static, and may be configured to identify an application of a mobile phone gesture (such as a handover between horizontal and longitudinal screens, a related game, and gesture calibration of a magnetometer), a related function of vibration identification (such as a pedometer and a knock), and the like. Another sensor, such as a gyroscope, a barometer, a hygrometer, a thermometer, and an infrared sensor may also be included in the terminal without departing from the scope of the present disclosure.

The audio circuit 1306, the speaker, and the microphone may provide audio interfaces between the user and the terminal. The audio circuit 1306 may convert received audio data into an electrical signal and transmit the electrical signal to the speaker. The speaker converts the electrical signal into a sound signal for output. On the other hand, the microphone converts a collected sound signal into an electrical signal. The audio circuit 1306 receives the electrical signal, converts the electrical signal into audio data, and outputs the audio data to the processor 1308 for processing. Then, the processor sends the audio data to, for example, another terminal by using the RF circuit 1301, or outputs the audio data to the memory 1302 for further processing. The audio circuit 1306 may further include an earplug jack, to provide communication between a peripheral earphone and the terminal.

Wi-Fi belongs to a short distance wireless transmission technology. The terminal may help, by using the circuitry included in Wi-Fi module 1307, a user to receive and send an email, browse a web page, access stream media, and the like. This provides wireless broadband Internet access for the user. Although FIG. 13 shows the Wi-Fi module 1307, it may be understood that the Wi-Fi module 1307 does not belong to mandatory configuration of the terminal, and may be omitted as needed without departing from the scope of the present disclosure.

The processor 1308 is the control center of the terminal, and is connected to various parts of the mobile phone by using various interfaces and lines. By running or executing the software program anchor module stored in the memory 1302, and invoking data stored in the memory 1302, the processor performs various functions and data processing of the terminal, thereby performing overall monitoring on the mobile phone. In an embodiment of this application, the processor 1308 may include the one or more processing cores, in an embodiment of this application, the processor 1308 may integrate an application processor and a modem processor. The application processor mainly processes an operating system, a user interface, an application program, and the like. The modem processor mainly processes wireless communication. It may be understood that the foregoing modem may alternatively not be integrated into the processor 1308.

The terminal further includes the power supply 1309 (such as a battery) for supplying power to the components. In an embodiment of this application, the power supply may be logically connected to the processor 1308 by using a power supply management system, to implement a function of managing charge, discharge, power consumption, and the like by using the power supply management system. The power supply 1309 may further include one or more of a direct current or alternating current power supply, a recharging system, a power failure detection circuit, a power supply converter or inverter, a power supply state indicator, and any other components.

Although not shown, the terminal may further include a camera, a Bluetooth module, and the like, and details are not described herein again. Specifically, in an exemplary embodiment, the processor 1308 in the terminal may load, according to the following instruction, executable files corresponding to processes of one or more application programs, into the memory 1302, and the processor 1308 runs an application program, for example, the foregoing method for generating a cartoon face image, stored in the memory 1302, to perform a method in which a to-be-processed face image is obtained. Face feature information is recognized from the to-be-processed face image. The face feature information includes facial feature information. Cartoon materials corresponding to feature parts of a face in the to-be-processed face image are obtained according to the face feature information. The cartoon face materials include cartoon facial feature materials and another cartoon material other than the cartoon facial feature materials. Each material of the cartoon facial feature materials is adjusted by using an adjustment parameter. The other cartoon material is combined with the adjusted cartoon facial feature materials, to generate the cartoon face image.

In an exemplary embodiment of the present disclosure, facial feature profile information of the to-be-processed face image and facial feature profile information of a preset standard face image may be obtained, and an offset ratio and/or a scaling ratio of each material of the cartoon facial feature materials are obtained according to the facial feature profile information, to obtain the adjustment parameter. Alternatively, a preset offset ratio and/or a preset scaling ratio of each material of the cartoon facial feature materials may be obtained according to the cartoon facial feature materials, to obtain the adjustment parameter.

In an exemplary embodiment of this application, facial feature information and hairstyle information of the to-be-processed face image may be obtained by using a multi-task convolutional neural network model. Gender information, age information, glasses information, hair color information and hair length information of the to-be-processed face image may be obtained by using a face attribute recognition network model, to obtain face attribute information, to obtain the face feature information according to the facial feature information, the hairstyle information, and the face attribute information.

In an exemplary embodiment of this application, an input image may be obtained. A body region in the input image may be recognized by using a fully convolutional network model, and a background region, which is other than the body region, is removed from the input image, to further obtain the to-be-processed face image.

In an exemplary embodiment, the cartoon materials corresponding to the feature parts of the face in the to-be-processed face image are obtained according to the face feature information, and then the cartoon materials are combined to generate the cartoon face image. Because the cartoon materials of the feature parts are obtained one by one, the feature parts of the face in the generated cartoon face image may be independent of each other. In this way, an operation such as modification or replacement can be independently performed on a feature part in the cartoon face image subsequently without affecting another feature part, so that the operability of the cartoon face image is improved. In addition, when the materials of the cartoon facial feature materials are adjusted, one material is also prevented from being affected when another material is adjusted. In addition, after the cartoon materials of the feature parts are obtained one by one, another processing may alternatively be performed on the cartoon materials. For example, the cartoon materials may be used for producing a sticker set. As a result, the operability of the material is improved. In addition, the cartoon face image is combined and generated by obtaining the cartoon materials of the feature parts one by one, and this may further improve, compared with a manner of drawing based on an edge, the similarity of the cartoon face images. In addition, in this solution, after the cartoon materials of the feature parts are determined, each material of the cartoon facial feature materials is adjusted by using the adjustment parameter, so that the cartoon facial feature materials are more similar to real facial features, thereby further improving the similarity between the cartoon face image and the to-be-processed face image.

A person of ordinary skill in the art may understand that, all or some steps of various methods in the embodiments may be implemented through instructions, or implemented through instructions controlling relevant hardware, and the instructions may be stored in a non-transitory computer-readable storage medium and loaded and executed by a processor.

Accordingly, an exemplary embodiment of this application provides a non-transitory computer storage medium, storing a plurality of instructions, the instructions that can be loaded by the processor to perform the steps in any method for generating a cartoon face image according to the embodiments of this application. For example, the instruction may cause the processor to perform a method in which a to-be-processed face image is obtained. Face feature information is recognized from the to-be-processed face image. The face feature information includes facial feature information. Cartoon materials corresponding to feature parts of a face in the to-be-processed face image are obtained according to the face feature information, to obtain cartoon face materials. The cartoon face materials include cartoon facial feature materials and another cartoon material other than the cartoon facial feature materials. Each material of the cartoon facial feature materials is adjusted by using an adjustment parameter, and the other cartoon material are combined with lire adjusted cartoon facial feature materials to generate a cartoon face image.

In an exemplary embodiment of the present disclosure, facial feature profile information of the to-be-processed face image and facial feature profile information of a preset standard face image may be obtained. An offset ratio and/or a scaling ratio of each material of the cartoon facial feature materials are obtained according to the facial feature profile information, to obtain the adjustment parameter. Alternatively, a preset offset ratio and/or a preset scaling ratio of each material of the cartoon facial feature materials may be obtained according to the cartoon facial feature materials, to obtain the adjustment parameter.

In an exemplary embodiment of the present disclosure, facial feature information and hairstyle information of the to-be-processed face image may be obtained by using a multi-task convolutional neural network model. Gender information, age information, glasses information, hair color information and hair length information of the to-be-processed face image may be obtained by using a face attribute recognition network model, to obtain face attribute information, to obtain the face feature information according to the facial feature information, the hairstyle information, and the face attribute information.

In an exemplary embodiment of this application, an input image may be obtained. A body region in the input image may be recognized by using a fully convolutional network model, and a background region, which is other than the body region, is removed from the input image, to further obtain the to-be-processed face image.

The non-transitory storage medium may include a read-only memory (ROM), a random access memory (RAM), a magnetic disk, an optical disc, or the like. Since the instructions stored in the storage medium may cause the processor to perform the steps of any method for generating a cartoon face image in the embodiments of this application, the instructions can implement advantageous effects that may be implemented by any method for generating a cartoon face image in the exemplary embodiments of the present disclosure.

The method and the apparatus for generating a cartoon face image, and the computer storage medium provided in the embodiments of this application are described in detail above. The principles and exemplary embodiments of the present disclosure are described herein by using specific examples. However, these are merely used for helping understand the method and core ideas of this application. A person skilled in the art will recognize that numerous variations may be made to the exemplary embodiments described herein, and that aspects of the embodiments described herein may be combined other than as described, without departing from the scope of the present disclosure.

What is claimed is:

1. A method for generating a cartoon face image, performed by a computing device, the method comprising:
    obtaining, by circuitry, a to-be-processed face image;
    recognizing, by the circuitry, face feature information from the to-be-processed face image including coordinates of key location points;
    separately obtaining, by the circuitry, each of different cartoon feature parts of a face in the to-be-processed face image according to the face feature information, the cartoon feature parts being obtained independently of facial contour information of the face in the to-be-processed face image, the cartoon feature parts including cartoon facial parts and another cartoon material other than the cartoon facial parts;
    separately adjusting, by the circuitry, each of the cartoon facial parts by using an adjustment parameter corresponding to the respective cartoon facial part, the adjustment parameter corresponding to the respective cartoon facial part including at least one of an offset ratio or a scaling ratio based on one or more of the coordinates of the key location points of the face feature information from the to-be-processed face image and based on one or more coordinates of key location points of a preset standard face image, such that an offset ratio or a scaling ratio of a first cartoon facial part is different from an offset ratio or a scaling ratio of a second cartoon facial part with respect to standard cartoon facial feature parts corresponding respectively to the first cartoon facial part and the second cartoon facial part; and
    combining, by the circuitry, the other cartoon material with the cartoon facial parts after adjustment to generate the cartoon face image,
    wherein the scaling ratio is obtained according to a first ratio and a second ratio, the first ratio being a ratio of a first dimension of a first facial part in the to-be-processed face image to a second dimension of a second facial part in the to-be-processed face image and the second ratio being a ratio of the first dimension of the first facial part in the preset standard face image to the second dimension of the second facial part in the preset standard face image, and
    wherein the offset ratio is a ratio of a first distance ratio of facial parts of the to-be-processed face image to a second distance ratio of the facial parts of the standard face image, the first distance ratio being a ratio of a distance between the facial parts in the to-be-processed face image to a width of a face shape of the to-be-processed face image and the second distance ratio being a ratio of a distance between the facial parts in the standard face image to a width of a face shape of the standard face image.

2. The method according to claim 1, wherein the separately adjusting each of the cartoon facial parts comprises:
    obtaining the face feature information of the to-be-processed face image and face feature information of the preset standard face image respectively; and
    obtaining the at least one of an offset ratio or a scaling ratio of each of the cartoon facial parts according to the face feature information of the to-be-processed face image and the face feature information of the preset standard face image to obtain the adjustment parameter of the respective cartoon facial part.

3. The method according to claim 2, wherein the obtaining the face feature information of the to-be-processed face image and the face feature information of the preset standard face image comprises:
    respectively obtaining the coordinates of the key location points based on profiles of a face shape, eyebrows, eyes, a nose, and a mouth of the to-be-processed face image and the coordinates of the key location points based on profiles of a face shape, eyebrows, eyes, a nose, and a mouth of the preset standard face image, to obtain the face feature information of the to-be-processed face image and the face feature information of the preset standard face image.

4. The method according to claim 3, wherein after the respectively obtaining the coordinates of the key location points based on the profiles of the face shape, the eyebrows, the eyes, the nose, and the mouth of the to-be-processed face image and the coordinates of the key location points based on the profiles of the face shape, the eyebrows, the eyes, the nose, and the mouth of the preset standard face image, the method further comprises:
    determining a transform matrix according to a preset organ part of the to-be-processed face image and coordinates of key location points on profiles of corresponding organ parts in the preset standard face image;
    converting, by using the transform matrix, the coordinates of the key location points based on the profiles of the face shape, the eyebrows, the eyes, the nose, and the mouth of the to-be-processed face image into coordinates in a coordinate space of the standard face image, to adjust the face feature information of the to-be-processed face image; and
    obtaining the at least one of the offset ratio or the scaling ratio of each of the cartoon facial parts according to the adjusted face feature information of the to-be-processed face image to obtain the adjustment parameter of the respective cartoon facial part.

5. The method according to claim 2, wherein the obtaining the at least one of the offset ratio or the scaling ratio of each of the cartoon facial parts comprises:
    obtaining a height scaling ratio of a face shape cartoon facial part;
    obtaining a horizontal offset ratio, a vertical offset ratio, a height scaling ratio, and a width scaling ratio of an eyebrow cartoon facial part; and obtaining a horizontal offset ratio, a height scaling ratio, and a width scaling ratio of an eye cartoon facial part.

6. The method according to claim 5, wherein the separately adjusting each of the cartoon facial parts comprises:
adjusting a height of the face shape cartoon facial part according to the height scaling ratio of the face shape cartoon facial part, size information of the face shape cartoon facial part, and size information of a face shape part of the standard cartoon facial feature parts.

7. The method according to claim 5, wherein the separately adjusting each of the cartoon facial parts further comprises:
adjusting a horizontal location, a vertical location, a width, and a height of the eyebrow cartoon facial part according to the horizontal offset ratio, the vertical offset ratio, the height scaling ratio, and the width scaling ratio of the eyebrow cartoon facial part, location information and size information of the eyebrow cartoon facial part, and location information and size information of an eyebrow part of the standard cartoon facial feature parts; and
adjusting a horizontal location, a height, and a width of the eye cartoon facial part according to the horizontal offset ratio, the height scaling ratio, and the width scaling ratio of the eye cartoon facial part, location information and size information of the eye cartoon facial part, and location information and size information of an eye part of the standard cartoon facial feature parts.

8. The method according to claim 2, wherein the obtaining the at least one of the offset ratio or the scaling ratio of each of the cartoon facial parts further comprises:
obtaining a vertical offset ratio and a width scaling ratio of a nose cartoon facial part; and
obtaining a vertical offset ratio, a height scaling ratio, and a width scaling ratio of a mouth cartoon facial part.

9. The method according to claim 8, wherein the separately adjusting each of the cartoon facial parts further comprises:
adjusting a vertical location and a width of the nose cartoon facial part according to the vertical offset ratio and the width scaling ratio of the nose cartoon facial part, location information and size information of the nose cartoon facial part, and location information and size information of a nose part of the standard cartoon facial feature parts; and
adjusting a vertical location, a width, and a height of the mouth cartoon facial part according to the vertical offset ratio, the width scaling ratio, and the height scaling ratio of the mouth cartoon facial part, location information and size information of the mouth cartoon facial part, and location information and size information of a mouth part of the standard cartoon facial feature parts.

10. The method according to claim 2, wherein after the obtaining the at least one of the offset ratio or the scaling ratio of each of the cartoon facial parts, the method further comprises:
adjusting the at least one of the offset ratio or the scaling ratio of each of the cartoon facial parts according to a preset weight to generate at least one adjusted offset ratio or adjusted scaling ratio for each of the cartoon facial parts; and
adjusting each of the cartoon facial parts according to the at least one adjusted offset ratio or adjusted scaling ratio of the respective cartoon facial part.

11. The method according to claim 1, wherein the separately adjusting each of the cartoon facial parts comprises:
obtaining at least one of a preset offset ratio or a preset scaling ratio of each of the cartoon facial parts to obtain the adjustment parameter of the respective cartoon facial part.

12. The method according to claim 1, wherein the recognizing the face feature information from the to-be-processed face image comprises:
obtaining facial feature information and hairstyle information of the to-be-processed face image;
obtaining gender information, age information, glasses information, hair color information, and hair length information of the to-be-processed face image to obtain face attribute information, and
obtaining the face feature information according to the facial feature information, the hairstyle information, and the face attribute information.

13. The method according to claim 12, wherein the facial feature information and the hairstyle information of the to-be-processed face image is obtained via a multi-task convolutional neural network model.

14. The method according to claim 12, wherein the gender information, the age information, the glasses information, the hair color information, and the hair length information of the to-be-processed face image is obtained via a face attribute recognition network model.

15. The method according to claim 12, wherein the separately obtaining each of the different cartoon feature parts comprises:
obtaining a cartoon hairstyle feature part according to the hairstyle information, the hair color information, and the hair length information, the cartoon hairstyle feature part comprising a cartoon back hair feature part in a case that the hair length information indicates long hair;
obtaining a cartoon glasses feature part according to the glasses information in a case that the glasses information indicates that glasses are worn; and
obtaining at least one of a cartoon face wrinkle feature part or a cartoon face nasolabial fold feature part according to the age information in a case that the age information indicates an age that is greater than a preset age.

16. The method according to claim 15, wherein the obtaining the cartoon hairstyle feature part according to the hairstyle information, the hair color information, and the hair length information comprises:
determining, according to the hairstyle information, a cartoon hairstyle category to which a hairstyle of the to-be-processed face image belongs, to further determine a plurality of hair shape feature parts in the cartoon hairstyle category;
matching the hairstyle of the to-be-processed face image with the plurality of hair shape feature parts one by one, to obtain a similarity between the hairstyle of the to-be-processed face image and each of the hair shape feature parts; and
determining a hair shape feature part among the plurality of hair shape feature parts with a highest similarity as a hair shape feature part corresponding to the hairstyle information of the to-be-processed face image.

17. The method according to claim 1, wherein the obtaining the to-be-processed face image comprises:
obtaining an input image;
recognizing a body region in the input image by using a fully convolutional network model; and removing a background region, which is other than the body region, from the input image, to further obtain the to-be-processed face image.

18. An apparatus for generating a cartoon face image, comprising:

circuitry configured to:

obtain a to-be-processed face image;

recognize face feature information from the to-be-processed image including coordinates of key location points;

separately obtain each of different cartoon feature parts of a face in the to-be-processed image according to the face feature information, the cartoon feature parts being obtained independently of facial contour information of the face in the to-be-processed face image, the cartoon feature parts including cartoon facial parts and another cartoon material other than the cartoon facial parts;

separately adjust each of the cartoon facial parts by using an adjustment parameter corresponding to the respective cartoon facial part, the adjustment parameter corresponding to the respective cartoon facial part including at least one of an offset ratio or a scaling ratio based on one or more of the coordinates of the key location points of the face feature information from the to-be-processed face image and based on one or more coordinates of key location points of a preset standard face image, such that an offset ratio or a scaling ratio of a first cartoon facial part is different from an offset ratio or a scaling ratio of a second cartoon facial part with respect to standard cartoon facial feature parts corresponding respectively to the first cartoon facial part and the second cartoon facial part; and combine the other cartoon material with the adjusted cartoon facial parts to generate the cartoon face image, wherein the scaling ratio is obtained according to a first ratio and a second ratio, the first ratio being a ratio of a first dimension of a first facial part in the to-be-processed face image to a second dimension of a second facial part in the to-be-processed face image and the second ratio being a ratio of the first dimension of the first facial part in the preset standard face image to the second dimension of the second facial part in the preset standard face image, and wherein the offset ratio is a ratio of a first distance ratio of facial parts of the to-be-processed face image to a second distance ratio of the facial parts of the standard face image, the first distance ratio being a ratio of a distance between the facial parts in the to-be-processed face image to a width of a face shape of the to-be-processed face image and the second distance ratio being a ratio of a distance between the facial parts in the standard face image to a width of a face shape of the standard face image.

19. The apparatus according to claim 18, wherein the circuitry is further configured to:

obtain the face feature information of the to-be-processed face image and face feature information of the preset standard face image; and obtain the at least one of an offset ratio or a scaling ratio of each of the cartoon facial parts according to the face feature information of the to-be-processed face image and the face feature information of the preset standard face image, to obtain the adjustment parameter of the respective cartoon facial part.

20. A non-transitory computer-readable medium storing computer-readable instructions thereon that, when executed by a processor, cause the processor to perform a method, comprising:

obtaining a to-be-processed face image;

recognizing face feature information from the to-be-processed face image including coordinates of key location points;

separately obtaining each of different cartoon feature parts of a face in the to-be-processed face image according to the face feature information, the cartoon feature parts being obtained independently of facial contour information of the face in the to-be-processed face image, the cartoon feature parts including cartoon facial parts and another cartoon material other than the cartoon facial parts;

separately adjusting each of the cartoon facial parts by using an adjustment parameter corresponding to the respective cartoon facial part, the adjustment parameter corresponding to the respective cartoon facial part including at least one of an offset ratio or a scaling ratio based on one or more of the coordinates of the key location points of the face feature information from the to-be-processed face image and based on one or more coordinates of key location points of a preset standard face image, such that an offset ratio or a scaling ratio of a first cartoon facial part is different from an offset ratio or a scaling ratio of a second cartoon facial part with respect to standard cartoon facial feature parts corresponding respectively to the first cartoon facial part and the second cartoon facial part; and combining the other cartoon material with the cartoon facial parts after adjustment to generate a cartoon face image, wherein the scaling ratio is obtained according to a first ratio and a second ratio, the first ratio being a ratio of a first dimension of a first facial part in the to-be-processed face image to a second dimension of a second facial part in the to-be-processed face image and the second ratio being a ratio of the first dimension of the first facial part in the preset standard face image to the second dimension of the second facial part in the preset standard face image, and wherein the offset ratio is a ratio of a first distance ratio of facial parts of the to-be-processed face image to a second distance ratio of the facial parts of the standard face image, the first distance ratio being a ratio of a distance between the facial parts in the to-be-processed face image to a width of a face shape of the to-be-processed face image and the second distance ratio being a ratio of a distance between the facial parts in the standard face image to a width of a face shape of the standard face image.

* * * * *